United States Patent
Yasuda et al.

(10) Patent No.: US 10,674,565 B2
(45) Date of Patent: Jun. 2, 2020

(54) COMMUNICATION METHOD

(71) Applicant: NEC CORPORATION, Tokyo (JP)

(72) Inventors: Masato Yasuda, Tokyo (JP); Gen Motoyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 16/063,561

(22) PCT Filed: Nov. 30, 2016

(86) PCT No.: PCT/JP2016/085545
§ 371 (c)(1),
(2) Date: Jun. 18, 2018

(87) PCT Pub. No.: WO2017/119219
PCT Pub. Date: Jul. 13, 2017

(65) Prior Publication Data
US 2018/0376535 A1   Dec. 27, 2018

(30) Foreign Application Priority Data
Jan. 6, 2016   (JP) .................... 2016-000858

(51) Int. Cl.
*H04W 92/18*   (2009.01)
*H04W 76/10*   (2018.01)
(Continued)

(52) U.S. Cl.
CPC ........ *H04W 92/18* (2013.01); *H04L 12/4633* (2013.01); *H04L 67/104* (2013.01);
(Continued)

(58) Field of Classification Search
CPC .................. H04W 92/18; H04W 76/30
See application file for complete search history.

(56) References Cited

U.S. PATENT DOCUMENTS 8,660,129 B1 *   2/2014   Brendel ............. H04L 12/4641
                                                                    370/397
9,641,462 B2 *   5/2017   Janakiraman ......... H04W 40/24
(Continued)

FOREIGN PATENT DOCUMENTS

CN        101399774 B  *  7/2012    ............ H04L 12/56
JP        2000-174812 A    6/2000
(Continued)

OTHER PUBLICATIONS

Wi-Fi Alliance Technical Committee P2P Task Group, Wi-Fi Peer-to-Peer (P2P) Technical Specification Version 1.1, 159 Pages.
(Continued)

*Primary Examiner* — Zhensheng Zhang
(74) *Attorney, Agent, or Firm* — Sughrue Mion, PLLC

(57) ABSTRACT

A delivery node alternately connects to a first wireless terminal and a second wireless terminal. When a first packet with a virtual IP address of the second wireless terminal as a destination IP address is output from a first application to a virtual network interface, the first wireless terminal encapsulates the first packet with the use of an encapsulation header and transmits to the delivery node. The delivery node encapsulates the first packet obtained by decapsulating the received encapsulation packet again, and transmits to the second wireless terminal. The second wireless terminal transmits the first packet obtained by decapsulating the received encapsulation packet to a second application through a virtual network interface.

16 Claims, 27 Drawing Sheets

(51) Int. Cl.
*H04W 84/20* (2009.01)
*H04L 29/08* (2006.01)
*H04W 76/30* (2018.01)
*H04L 12/46* (2006.01)
*H04L 29/06* (2006.01)
*H04W 84/12* (2009.01)
*H04W 8/00* (2009.01)

(52) U.S. Cl.
CPC .......... *H04L 67/1059* (2013.01); *H04L 69/16* (2013.01); *H04W 76/10* (2018.02); *H04W 76/30* (2018.02); *H04W 84/20* (2013.01); *H04W 8/005* (2013.01); *H04W 84/12* (2013.01)

(56) References Cited

U.S. PATENT DOCUMENTS

| | | | |
|---|---|---|---|
| 2014/0177472 | A1 | 6/2014 | Halasz et al. |
| 2015/0023175 | A1* | 1/2015 | Wu .................. H04L 47/27 370/236 |

FOREIGN PATENT DOCUMENTS

| | | |
|---|---|---|
| JP | 2005-518734 A | 6/2005 |
| JP | 2006-115505 A | 4/2006 |
| JP | 2008-092170 A | 4/2008 |
| JP | 2013-526234 A | 6/2013 |
| WO | 2006/059639 A1 | 6/2006 |
| WO | 2016/024399 A1 | 2/2016 |

OTHER PUBLICATIONS

Chaki Prakash et al., "Dynamic Topology Reformation for Content Dissemination Wi-Fi Peer-to-peer Networks," The Institute of Electronics, Information and Communication Engineers, Feb. 24, 2015, Proceedings of the 2015 IEICE General Conference BS-3-53, 2 pages.

International Search Report for PCT/JP2016/085545 dated Jan. 24, 2017.

* cited by examiner

FIG. 11A

| NODE IDENTIFIER | MAC ADDRESS | PHYSICAL IP ADDRESS | VIRTUAL IP ADDRESS | OWNER BIT | GROUP IDENTIFIER |
|---|---|---|---|---|---|
| 101-1 | MACAddress1 | PIPAddress1 | VIPAddress1 | 1 | G1 |
| 101-2 | MACAddress2 | PIPAddress2 | VIPAddress2 | 0 | G1 |
| 101-3 | MACAddress3 | PIPAddress3 | VIPAddress3 | 0 | G1 |
| 101-4 | MACAddress4 | PIPAddress4 | VIPAddress4 | 0 | G1 |

FIG. 11B

| NODE IDENTIFIER | MAC ADDRESS | PHYSICAL IP ADDRESS | VIRTUAL IP ADDRESS | OWNER BIT | GROUP IDENTIFIER |
|---|---|---|---|---|---|
| 101-5 | MACAddress5 | PIPAddress5 | VIPAddress5 | 1 | G2 |
| 101-6 | MACAddress6 | PIPAddress6 | VIPAddress6 | 0 | G2 |
| 101-7 | MACAddress7 | PIPAddress7 | VIPAddress7 | 0 | G2 |

COMMUNICATION METHOD

CROSS REFERENCE TO RELATED APPLICATIONS

This application is a National Stage of International Application No. PCT/JP2016/085545 filed Nov. 30, 2016, claiming priority based on Japanese Patent Application No. 2016-000858 filed Jan. 6, 2016, the disclosure of which is incorporated herein in its entirety by reference.

TECHNICAL FIELD

The present invention relates to a wireless terminal (a P2P terminal) capable of peer-to-peer (hereinafter referred to as "P2P") mutual wireless connection, a communication control method and program thereof, a communication method, and a communication system.

BACKGROUND ART

In recent years, Wi-Fi Direct as an interterminal communication scheme attracts attention from the viewpoint of broadband, enhanced security, and so on. A previous Wi-Fi network operates in an infrastructure mode with a specific device as an access point (AP). On the other hand, in a network conforming to Wi-Fi Direct, any P2P terminal, not a specific device, becomes an owner of a group, thereby enabling communication within the group (for example, see Non-Patent Document 1). A group owner is a P2P terminal operating as an access point of a group and, as a parent of the group, can form a group including another P2P terminal as a child (a client).

Within a P2P group formed in this manner, data can be transferred at high speeds between terminals without connecting to the Internet or the like. In particular, Wi-Fi Direct supports a robust security protocol, and therefore, can realize higher security than a conventional ad hoc mode (IBSS: Independent Basic Service Set, or the like).

However, in the wireless P2P network mentioned above, each group is independently formed and operates, so that communication is restricted within the group. Moreover, in general, the maximum number of terminals in one group has a physical upper limit. For example, in a case where Wi-Fi Direct is implemented with the use of an inexpensive wireless LAN device, the number of terminals in one group is limited to the upper limit of 5 to 10 supported by the device. Such group size limitation restricts message sharing only to the terminals in one group and hampers information sharing in a larger network including a plurality of groups. In the wireless P2P network mentioned above, it is impossible to notify, for example, disaster information, traffic information, SOS signals, voice signals or the like having urgency beyond a local group.

In view of such circumstances, Non-Patent Document 2 proposes a method of communicating between groups via a delivery node. In the communication method described in Non-Patent Document 2, a group owner of a first group selects one or a plurality of client nodes of the first group as delivery nodes. Then, the delivery node disassociates itself from the first group to connect to a group owner of a second group existing nearby, and transmits and receives information to and from the group owner of the second group. A mechanism that a delivery node disassociates itself from a currently connected group and connects to another group is called "switching." The delivery node periodically performs switching between the first group and the second group, whereby the group owner of the first group and the group owner of the second group can bidirectionally convey information via the delivery node.

On the other hand, the following technique is proposed in relation to the present invention.

Patent Document 1 proposes a switch system that includes one or more ports on a switch configured to transmit an encapsulated packet in accordance with the TRILL protocol. Moreover, it is described in the paragraph 0106 of Patent Document 1 that it is possible to link a set of VMs (virtual machines) in a network with one port profile to group them. This grouping is grouping VMs all connected to the same VLAN and has a different concept from the group formed in the wireless P2P network.

Patent Document 2 proposes an information sharing system that can realize both proper confidential information sharing and ordinary broad information sharing within a group of users existing at remote places. However, a terminal does not perform switching between groups.

Patent Document 3 describes a method of constructing a VPN (Virtual Private Network) to realize communication between hosts. For example, a tunnel connection considering security is set up between networks where a VPN is constructed. For example, in a case where, in a connection configuration of PC (personal computer) 1—GW (gateway) 1—GW 2—PC 2, a VPN is configured with the use of the PC 1 and the PC 2, a tunnel connection is set up between the GW 1 and the GW 2. Then, communication between the hosts is realized by IP routing using a temporary IP address. However, Patent Document 3 does not describe a tunnel connection in a case where there is no fixed communication path between GW 1 and GW 2.

Patent Document 4 proposes a data communication apparatus that includes a congestion detection means. The congestion detection means determines whether or not the amount of data continuously transmitted from a transmission terminal is close to a continuously receivable data size notified to the transmission terminal and, if determining it is close, determines whether or not the continuously receivable data size can be increased and, if determining it can be increased, increases the continuously receivable data size and determines whether or not congestion has occurred while receiving data. When congestion is detected, the data communication apparatus reduces the continuously receivable data size and returns a response acknowledgement.

Patent Document 1: Japanese Translation of PCT Application Publication JP-A 2013-526234
Patent Document 2: Re-publication of PCT Publication WO 2006/059639
Patent Document 3: Japanese Unexamined Patent Application Publication JP-A 2008-092170
Patent Document 4: Japanese Unexamined Patent Application Publication JP-A 2000-174812
Non-Patent Document 1: Wi-Fi Alliance Technical Committee PSP Task Group, Wi-Fi Peer-to-Peer (P2P) Technical Specification Version 1.1
Non-Patent Document 2: Chaki Prakash, Masato Yasuda, Kazuaki Nakajima, "Dynamic Topology Reformation for Content Dissemination in Wi-Fi Peer-to-Peer Networks," the Institute of Electronics, Information and Communication Engineers, Feb. 24, 2015, Proceedings of the 2015 IEICE General Conference BS-3-53

However, the delivery node cannot simultaneously connect to both the first group and the second group. When connecting, the delivery node connects to only one of the groups. Thus, the delivery node becomes an end point of a communication path. Therefore, a wireless terminal belonging to the first group and a wireless terminal belonging to the second group cannot directly communicate. Such a problem is hard to solve even by combining the techniques described in Patent Documents 1 to 5 and Non-Patent Documents 1 and 2.

SUMMARY

An object of the present invention is to provide a communication system that solves the abovementioned problem, namely, the problem that it is impossible to perform direct communication between the groups via the delivery node.

A communication system according to an exemplary embodiment of the present invention is a communication system including a first wireless terminal, a second wireless terminal and a third wireless terminal. The first wireless terminal has a first physical IP address and a first virtual IP address and belongs to a first group. The second wireless terminal has a second physical IP address and a second virtual IP address and belongs to a second group. The third wireless terminal has a third physical IP address and alternately performs switching to disassociate itself from the first group and connect to the second group and switching to disassociate itself from the second group and connect to the first group.

The first wireless terminal includes:
a first application execution part configured to execute a first application program to perform communication;
a first physical network interface having the first physical IP address;
a first virtual network interface having the first virtual IP address; and
a first control part.

The second wireless terminal includes:
a second application execution part configured to execute a second application program to perform communication;
a second physical network interface having the second physical IP address;
a second virtual network interface having the second virtual IP address; and
a second control part.

The third wireless terminal includes:
a third physical network interface having the third physical IP address; and
a third control part.

The first control part is configured to, upon receiving a first packet having a first header with the second virtual IP address set as a destination IP address from the first application execution part through the first virtual network interface, while the third wireless terminal is being connected to the first wireless terminal, transmit a first encapsulation packet to the third wireless terminal through the first physical network interface, the first encapsulation packet being obtained by encapsulating the first packet with use of a first encapsulation header with the third physical IP address set as a destination IP address.

The third control part is configured to, upon receiving the first encapsulation packet through the third physical network interface, while the second wireless terminal is being connected to the third wireless terminal, transmit a second encapsulation packet to the second wireless terminal through the third physical network interface, the second encapsulation packet being obtained by encapsulating the first packet obtained by decapsulating the first encapsulation packet with use of a second encapsulation header with the second physical IP address set as a destination IP address.

The second control part is configured to, upon receiving the second encapsulation packet through the second physical network interface, transmit the first packet obtained by decapsulating the second encapsulation packet to the second application execution part through the second virtual network interface.

A communication method according to another exemplary embodiment of the present invention is a communication method executed by a communication system.

The communication system includes a first wireless terminal, a second wireless terminal and a third wireless terminal. The first wireless terminal has a first physical IP address and a first virtual IP address and belongs to a first group. The second wireless terminal has a second physical IP address and a second virtual IP address and belongs to a second group, The third wireless terminal has a third physical IP address and alternately performs switching to disassociate itself from the first group and connect to the second group and switching to disassociate itself from the second group and connect to the first group.

The first wireless terminal includes a first application execution part configured to execute a first application program to perform communication, a first physical network interface having the first physical IP address, a first virtual network interface having the first virtual IP address, and a first control part.

The second wireless terminal includes a second application execution part configured to execute a second application program to perform communication, a second physical network interface having the second physical IP address, a second virtual network interface having the second virtual IP address, and a second control part.

The third wireless terminal includes a third physical network interface having the third physical IP address, and a third control part.

In the communication method:
upon receiving a first packet having a first header with the second virtual IP address set as a destination IP address from the first application execution part through the first virtual network interface, while the third wireless terminal is being connected to the first wireless terminal, the first control part transmits a first encapsulation packet to the third wireless terminal through the first physical network interface, the first encapsulation packet being obtained by encapsulating the first packet with use of a first encapsulation header with the third physical IP address set as a destination IP address;

upon receiving the first encapsulation packet through the third physical network interface, while the second wireless terminal is being connected to the third wireless terminal, the third control part transmits a second encapsulation packet to the second wireless terminal through the third physical network interface, the second encapsulation packet being obtained by encapsulating the first packet obtained by decapsulating the first encapsulation packet with use of a second encapsulation header with the second physical IP address set as a destination IP address; and upon receiving the second encapsulation packet through the second physical network interface, the second control part transmits the first packet obtained by decapsulating the second encapsulation packet to the second application execution part through the second virtual network interface.

A wireless terminal according to another exemplary embodiment of the present invention is a first wireless terminal having a first physical IP address and a first virtual IP address and belonging to a first group. The wireless terminal includes:

an application execution part configured to execute a first application program to perform communication;

a physical network interface having the first physical IP address;

a virtual network interface having the first virtual IP address.

A control part is configured to, upon receiving a first packet from the application execution part through the virtual network interface, while a third wireless terminal is being connected to the first wireless terminal, transmit a first encapsulation packet to the third wireless terminal through the physical network interface, the first packet having a first header with a second virtual IP address of a second wireless terminal set as a destination IP address, the second wireless terminal having a second physical IP address and a second virtual IP address and belonging to a second group, a second application program to perform communication running on the second wireless terminal, the third wireless terminal having a third physical IP address and alternately performing switching to disassociate itself from the first group and connect to the second group and switching to disassociate itself from the second group and connect to the first group, the first encapsulation packet being obtained by encapsulating the first packet with use of a first encapsulation header with the third physical IP address set as a destination IP address.

A wireless terminal according to another exemplary embodiment of the present invention is a third wireless terminal alternately performing switching to disassociate itself from a first group and connect to a second group and switching to disassociate itself from the second group and connect to the first group. The first group is a group to which a first wireless terminal having a first physical IP address and a first virtual IP address belongs. A first application program to perform communication runs on the first wireless terminal. The second group is a group to which a second wireless terminal having a second physical IP address and a second virtual IP address belongs. A second application program to perform communication runs on the second wireless terminal.

The wireless terminal includes:

a physical network interface having a third physical IP address; and a control part configured to, upon receiving a first encapsulation packet from the first wireless terminal through the physical network interface, while the second wireless terminal is being connected to the third wireless terminal, transmit a second encapsulation packet to the second wireless terminal through the physical network interface, the first encapsulation packet being obtained by encapsulating a first packet having a first header with the second virtual IP address set as a destination IP address with use of a first encapsulation header with the third physical IP address set as a destination IP address, the second encapsulation packet being obtained by encapsulating the first packet obtained by decapsulating the first encapsulation packet with use of a second encapsulation header with the second physical IP address set as a destination IP address.

A communication control method of a wireless terminal according to another exemplary embodiment of the present invention is a communication control method executed by a first wireless terminal. The wireless terminal has a first physical IP address and a first virtual IP address, belongs to a first group, and includes an application execution part configured to execute a first application program to perform communication, a physical network interface having the first physical IP address, a virtual network interface having the first virtual IP address and a control part.

Upon receiving a first packet from the application execution part through the virtual network interface, while a third wireless terminal is being connected to the first wireless terminal, the control part transmits a first encapsulation packet to the third wireless terminal through the physical network interface. The first packet has a first header with a second virtual IP address of a second wireless terminal set as a destination IP address. The second wireless terminal has a second physical IP address and a second virtual IP address and belongs to a second group. A second application program to perform communication runs on the second wireless terminal. The third wireless terminal has a third physical IP address and alternately performs switching to disassociate itself from the first group and connect to the second group and switching to disassociate itself from the second group and connect to the first group. The first encapsulation packet is obtained by encapsulating the first packet with use of a first encapsulation header with the third physical IP address set as a destination IP address.

A communication control method of a wireless terminal according to another exemplary embodiment of the present invention is a communication control method of a third wireless terminal. The wireless terminal alternately performs switching to disassociate itself from a first group and connect to a second group and switching to disassociate itself from the second group and connect to the first group. The first group is a group to which a first wireless terminal having a first physical IP address and a first virtual IP address belongs. A first application program to perform communication runs on the first wireless terminal. The second group is a group to which a second wireless terminal having a second physical IP address and a second virtual IP address belongs. A second application program to perform communication runs on the second wireless terminal. The wireless terminal includes a physical network interface having a third physical IP address and a control part.

Upon receiving a first encapsulation packet from the first wireless terminal through the physical network interface, while the second wireless terminal is being connected to the third wireless terminal, the control part transmits a second encapsulation packet to the second wireless terminal through the physical network interface. The first encapsulation packet is obtained by encapsulating a first packet having a first header with the second virtual IP address set as a destination IP address with use of a first encapsulation header with the third physical IP address set as a destination IP address. The second encapsulation packet is obtained by encapsulating the first packet obtained by decapsulating the first encapsulation packet with use of a second encapsulation header with the second physical IP address set as a destination IP address.

A computer program according to another exemplary embodiment of the present invention is a computer program including instructions for causing a computer to function as an application execution part, a physical network interface, a virtual network interface, and a control part.

The computer configures a first wireless terminal having a first physical IP address and a first virtual IP address and belonging to a first group.

The application execution part is configured to execute a first application program to perform communication.

The physical network interface has the first physical IP address.

The virtual network interface has the first virtual IP address.

The control part is configured to, upon receiving a first packet from the application execution part through the virtual network interface, while a third wireless terminal is being connected to the first wireless terminal, transmit a first encapsulation packet to the third wireless terminal through the physical network interface. The first packet has a first header with a second virtual IP address of a second wireless terminal set as a destination IP address. The second wireless terminal has a second physical IP address and a second virtual IP address and belongs to a second group. A second application program to perform communication runs on the second wireless terminal. The third wireless terminal has a third physical IP address and alternately performs switching to disassociate itself from the first group and connect to the second group and switching to disassociate itself from the second group and connect to the first group. The first encapsulation packet is obtained by encapsulating the first packet with use of a first encapsulation header with the third physical IP address set as a destination IP address.

A computer program according to another exemplary embodiment of the present invention is a computer program comprising instructions for causing a computer to function as a physical network interface and a control part.

The computer configures a third wireless terminal alternately performing switching to disassociate itself from a first group and connect to a second group and switching to disassociate itself from the second group and connect to the first group. The first group is a group to which a first wireless terminal having a first physical IP address and a first virtual IP address belongs. A first application program to perform communication runs on the first wireless terminal. The second group is a group to which a second wireless terminal having a second physical IP address and a second virtual IP address belongs. A second application program to perform communication runs on the second wireless terminal.

The physical network interface has a physical IP address.

The control part is configured to, upon receiving a first encapsulation packet from the first wireless terminal through the physical network interface, while the second wireless terminal is being connected to the third wireless terminal, transmit a second encapsulation packet to the second wireless terminal through the physical network interface, the first encapsulation packet is obtained by encapsulating a first packet having a first header with the second virtual IP address set as a destination IP address with use of a first encapsulation header with the third physical IP address set as a destination IP address. The second encapsulation packet is obtained by encapsulating the first packet obtained by decapsulating the first encapsulation packet with use of a second encapsulation header with the second physical IP address set as a destination IP address.

With the configurations described above, the present invention allows direct communication between the groups via the delivery node.

BRIEF DESCRIPTION OF DRAWINGS

FIG. 11 is a view showing an example of wireless terminal information held by the wireless terminal according to the first exemplary embodiment of the present invention;

EXEMPLARY EMBODIMENTS

Next, exemplary embodiments of the present invention will be described in detail with reference to the drawings.

First Exemplary Embodiment

Figure 1:
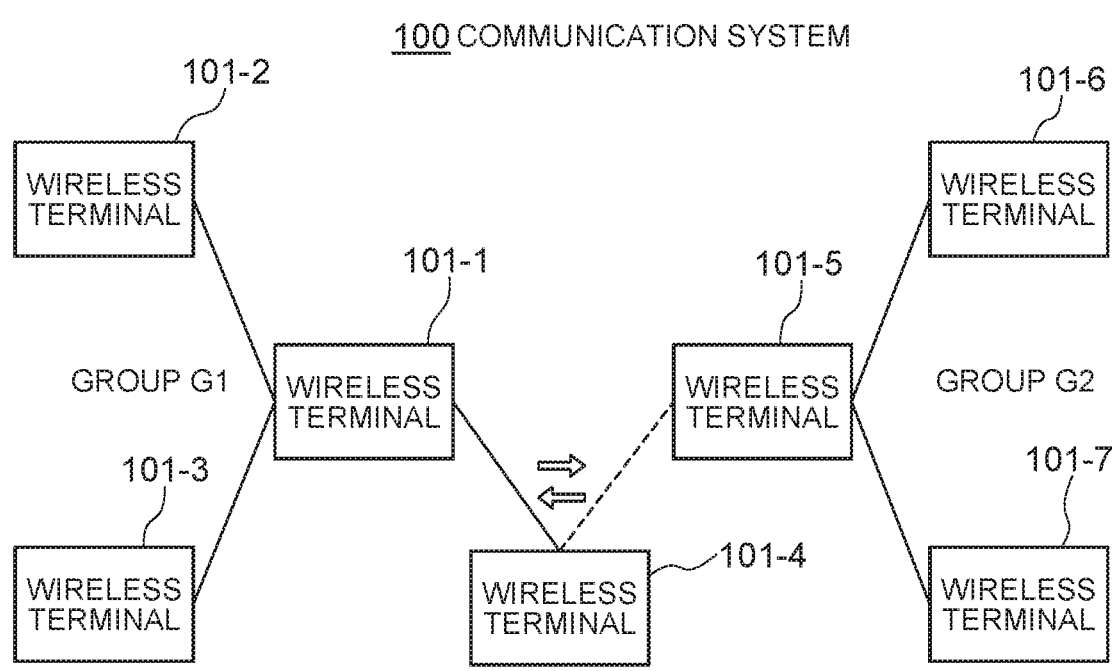
FIG. 1 is a view showing an example of an overall configuration of a communication system according to a first exemplary embodiment of the present invention.

With reference to FIG. 1, a communication system 100 according to a first exemplary embodiment of the present invention includes a plurality of wireless terminals 101. Each of the wireless terminals 101 is, for example, a mobile wireless terminal mounted on a vehicle such as a car or a mobile wireless terminal such as a smartphone owned by a pedestrian. Each of the wireless terminals 101 can perform wireless communication by a communication scheme capable of forming a peer-to-peer group (a P2P group). In this exemplary embodiment, the communication scheme is Wi-Fi Direct. However, the present invention is not limited to Wi-Fi Direct, and any communication scheme that allows formation of a peer-to-peer group with another wireless terminal can be applied.

In FIG. 1, the plurality of wireless terminals 101 form two peer-to-peer groups G1 and G2 (hereinafter, simply referred to as a group). The group G1 is formed with a wireless terminal 101-1 as a parent (a group owner), and wireless terminals 101-2 to 101-4 are its children (clients). The group G2 is formed with a wireless terminal 101-5 as a group owner, and wireless terminals 101-6 and 101-7 are its clients.

Between the wireless terminals 101-1 to 101-4 belonging to the group G1, communication by Wi-Fi Direct can be performed with the wireless terminal 101-1 as an access point. Also, between the wireless terminals 101-5 to 101-7 belonging to the group G2, communication by Wi-Fi Direct can be performed with the wireless terminal 101-5 as an access point. However, between the wireless terminals 101-1 to 101-4 belonging to the group G1 and the wireless terminals 101-5 to 101-7 belonging to the group G2, communication by Wi-Fi Direct cannot be performed directly because of difference of the groups. Therefore, in this exemplary embodiment, any of the clients of the group G1 or G2 becomes a delivery node, and the client serving as the delivery node repeatedly performs an operation of disassociating itself from the group G1 and connecting to the group G2 as a client, and vice versa, disassociating itself from the group G2 and connecting to the group G1 as a client, whereby indirect communication between the group G1 and the group G2 is realized through the delivery node. It is desired that a client serving as a delivery node is a wireless terminal that the group owners of the groups G1 and G2 exist within its communicable range by Wi-Fi Direct. In the following description, a case where the client 101-4 belonging to the group G1 that the wireless terminals 101-1 and 101-5 exist within its communicable range becomes a delivery node will be described as an example. However, a client serving as a delivery node is not limited to the wireless terminal 101-4, and may be any of the other clients 101-2 to 101-3 of the group G1 or the clients 101-6 to 101-7 of the group G2. Also, a plurality of clients may be delivery nodes.

Figure 2:
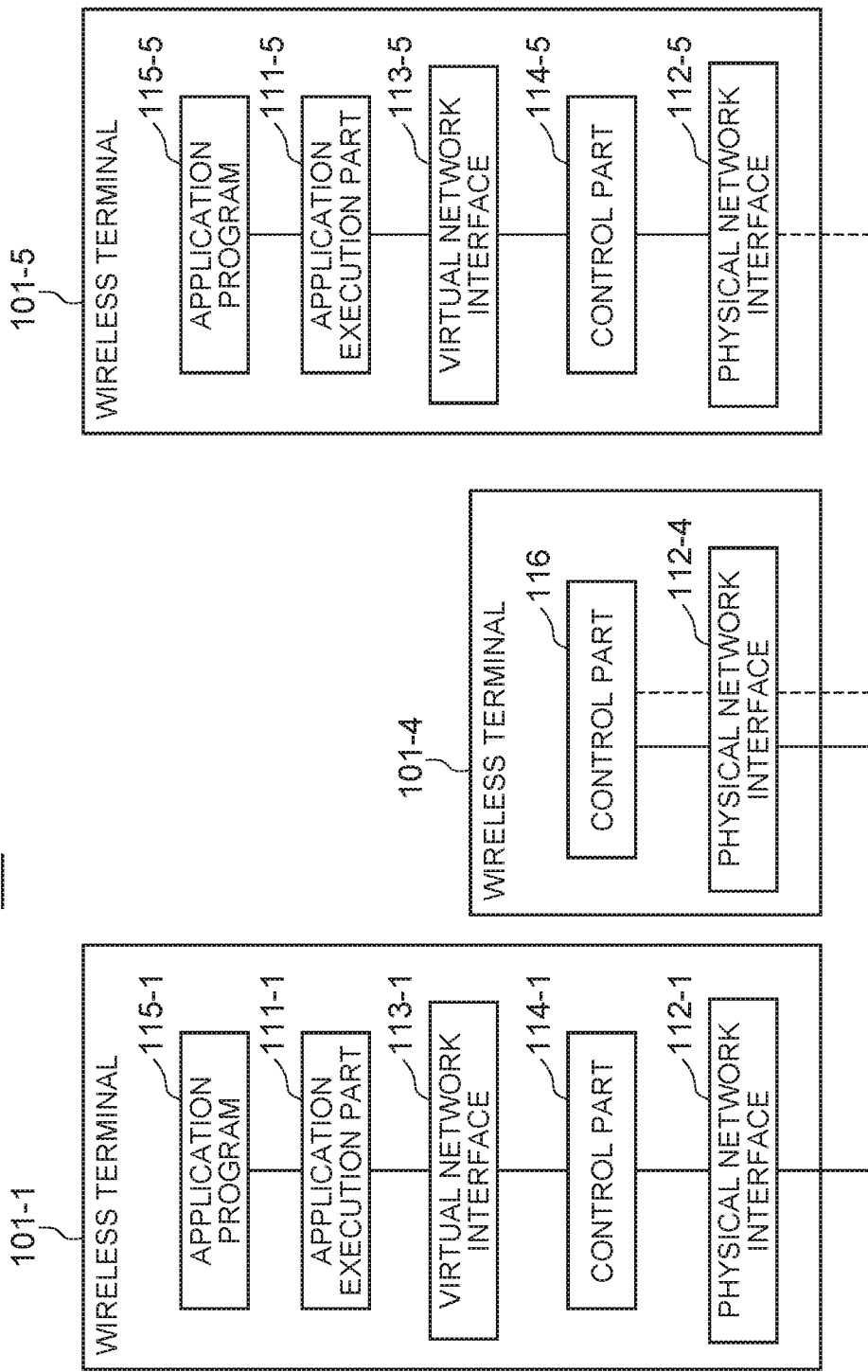
FIG. 2 is a block diagram of some of wireless terminals according to the first exemplary embodiment of the present invention.

FIG. 2 is a block diagram of some of wireless terminals configuring the communication system 100. With reference to FIG. 2, the wireless terminal 101-1 serving as the group owner of the group G1 has an application execution part 111-1, a physical network interface 112-1, a virtual network interface 113-1, and a control part 114-1.

The application execution part 111-1 has a function to execute an application program 115-1 to perform TCP/IP communication. For example, the application program 115-1 may be an application that communicates disaster information, traffic information, SOS signals or the like having urgency to an application program running on another wireless terminal. Alternatively, the application program 115-1 may be an application program that shares information such as a file with an application program running on another wireless terminal.

Alternatively, the application program 115-1 may be an application program that communicates multimedia information such as voice and video with an application program running on another wireless terminal.

The physical network interface 112-1 is a wireless access network interface that is physical. In the physical network interface 112-1, a physical IP address and a MAC address assigned to the wireless terminal 101-1 are set. The physical network interface 112-1 is also referred to as a physical NIC (network interface card).

The virtual network interface 113-1 is a network interface that is virtual. In the virtual network interface 113-1, a virtual IP address assigned to the wireless terminal 101-1 is set. The virtual network interface 113-1 has a function to transmit a packet received from the application execution part 111-1 not to a physical medium but to the control part 114-1 existing in a user's address space. The virtual network interface 113-1 also has a function to process a packet received from the control part 114-1 as if it is a packet received from an actual physical medium and transmit it to the application execution part 111-1. For example, the virtual network interface 113-1 can be realized by using a TAP device or a TUN device supported by a UNIX type OS.

The control part 114-1 has a function to, upon receiving a packet from the application execution part 111-1 through the virtual network interface 113-1, hold the received packet as a payload, encapsulate it by using another header with the IP address of the delivery node 101-4 as a destination IP address, and transmit it to the delivery node 101-4 via the physical network interface 112-1.

Figure 5:
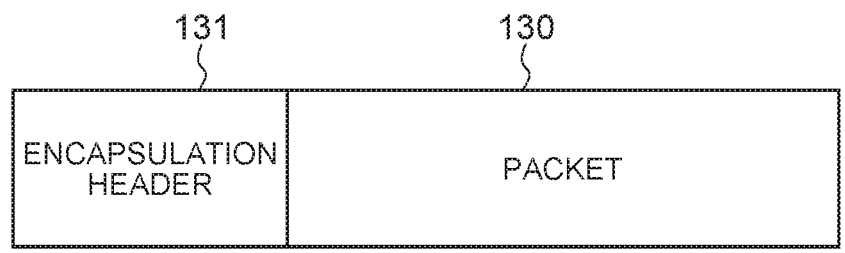
FIG. 5 is a view showing an example of a format of an encapsulation packet used in the first exemplary embodiment of the present invention.

In general, it is called tunneling to regard a certain packet 130 as a payload and encapsulate it by using another header 131 to transmit as shown in FIG. 5. Another header used for encapsulation is called an encapsulation header. A combination of the packet 130 and the encapsulation header 131 is called an encapsulation packet or an encapsulated packed.

Further, the control part 114-1 has a function to, upon receiving an encapsulated packet from the delivery node 101-4 through the physical network interface 112-1, remove an encapsulation header from the received encapsulation packet, namely, decapsulate the packet, and transmit it to the application execution part 111-1 through the virtual network interface 113-1.

The wireless terminal 101-5 serving as the group owner of the group G2 has an application execution part 111-5, a physical network interface 112-5, a virtual network interface 113-5, a control part 114-5, and an application program 115-5. The application execution part 111-5, the physical network interface 112-5, the virtual network interface 113-5, the control part 114-5 and the application program 115-5 have the same functions as the application execution part 111-1, the physical network interface 112-1, the virtual network interface 113-1, the control part 114-1 and the application program 115-1 of the wireless terminal 101-1.

The deliver node 101-4 has a physical network interface 112-4 and a control part 116. The physical network interface 112-4 has the same function as the physical network interface 112-1 of the wireless terminal 101-1.

The control part 116 has a function to perform switching that is disassociating the wireless terminal 101-4 from the group of the wireless terminal 101-1 and connecting to the group of the wireless terminal 101-5 and conversely perform switching that is disassociating the wireless terminal 101-4 from the group of the wireless terminal 101-5 and connecting to the group of the wireless terminal 101-1.

Further, the control part 116 has a function to, upon receiving an encapsulated packet from the wireless terminal 101-1 through the physical network interface 112-4, decapsulate the received encapsulation packet, capsulate it again by using an encapsulation header with the IP address of the wireless terminal 101-5 as a destination ID address, and transmit it to the wireless terminal 101-5 through the physical network interface 112-4. Also, the control part 116 has a function to, upon receiving an encapsulated packet from the wireless terminal 101-5 through the physical network interface 112-4, decapsulate the received encapsulation packet, encapsulate it again by using an encapsulation header with the IP address of the wireless terminal 101-1 as a destination IP address, and transmit it to the wireless terminal 101-1 through the physical network interface 112-4.

Figure 3:
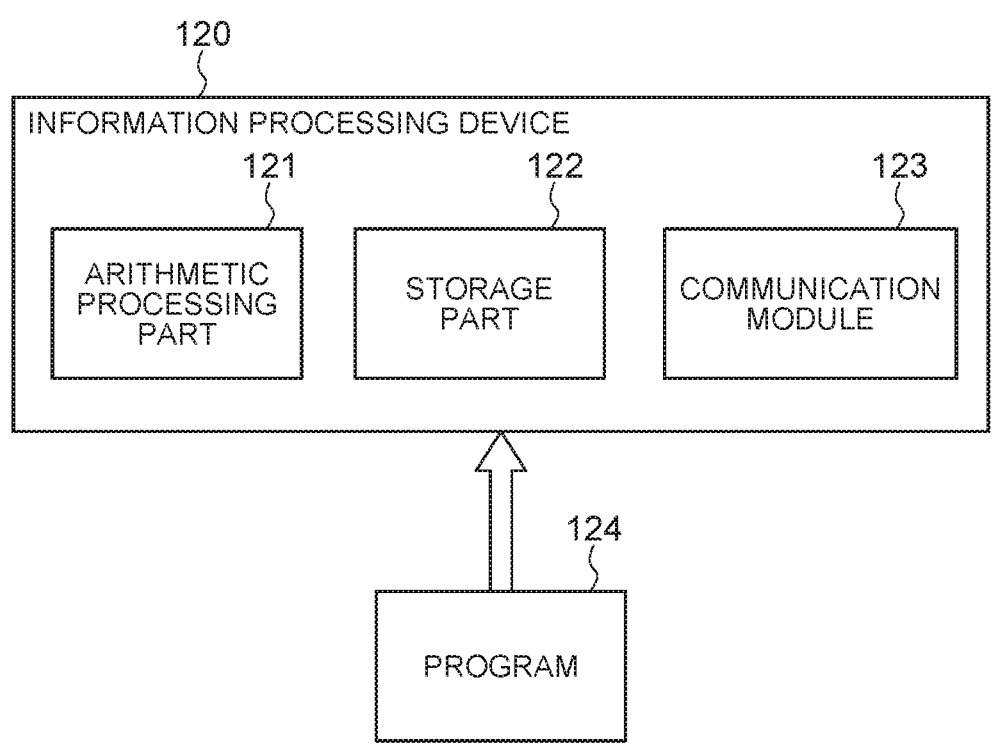
FIG. 3 is a view showing an example of a configuration of an information processing device that realizes the wireless terminal according to the first exemplary embodiment of the present invention.

The wireless terminal 101 as described above can be realized by an information processing device 120 including an arithmetic processing part 121 such as one or more microprocessors, a storage part 122 such as a memory and a hard disk and a communication module 123 and a program 124, for example, as shown in FIG. 3. The communication module 123 is used for communication between the wireless terminals 101. For example, the communication module 123 is a module that performs wireless communication by using a protocol of Wi-Fi Direct. The program 124 is loaded into the memory from an external computer-readable recording medium at the time of, for example, starting up the information processing device 120 and controls the operation of the arithmetic processing part 121, thereby realizing functional units, such as the application execution part 111, the physical network interface 112, the virtual network interface 113 and the control part 114, 116, on the arithmetic processing part 121.

Next, an operation that the application program 115-1 running on the wireless terminal 101-1 and the application program 115-5 running on the wireless terminal 101-5 directly perform TCP/IP communication by using TCP as a transport layer protocol in the communication system 100 shown in FIG. 2 will be described.

Figure 4:
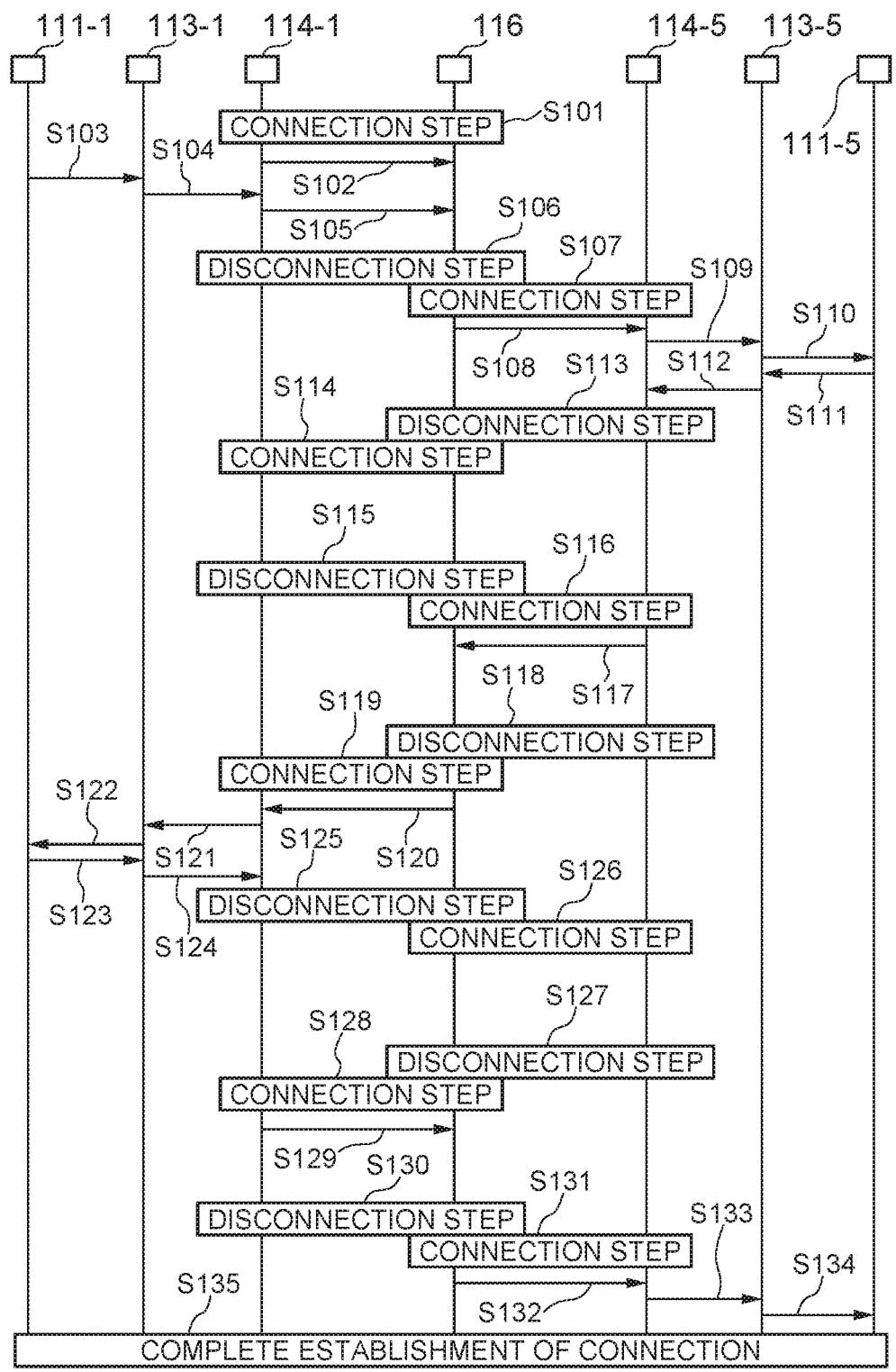
FIG. 4 is a sequence chart showing an example of a procedure for establishing a TCP connection between application programs running on the wireless terminals according to the first exemplary embodiment of the present invention.

FIG. 4 is a sequence chart showing an example of a procedure for selecting the wireless terminal 101-4 as a delivery node and establishing a TCP connection (also simply referred to as a connection) between the application program 115-1 running on the wireless terminal 101-1 and the application program 115-5 running on the wireless terminal 101-5 through the delivery node 101-4.

First, in a case where the wireless terminal 101-4 is not connected to the group G1, the control part 114-1 of the wireless terminal 101-1 executes a connection procedure conforming to Wi-Fi Direct with the control unit 116 of the wireless terminal 101-4, and connects the wireless terminal 101-4 as a client to the wireless terminal 101-1 (step S101). In a case where the wireless terminal 101-4 is already connected to the group G1, step S101 is omitted.

Next, the control part 114-1 of the wireless terminal 101-1 selects the wireless terminal 101-4 as a delivery node, and transmits delivery node designation information to the deliver node 101-4 (step S102). For example, the delivery node designation information is transmitted and received by performing TCP communication or UDP communication through the physical network interfaces 112-1 and 112-4 between the control part 114-1 of the wireless terminal 101-1 and the control part 116 of the wireless terminals 101-4.

The delivery node designation information includes information specifying the wireless terminal 101-4 to be a delivery node (for example, a node identifier), and further includes information specifying the wireless terminals 101-1 and 101-5 to be switching target (for example, a node identifier), a physical IP address, a virtual IP address, a MAC address and a switching condition. The switching condition includes a switching time in this exemplary embodiment. The switching time is a time from connecting to one of the two wireless terminals 101-1 and 101-5 to be switching terminals to disconnecting.

When each of the wireless terminals 101 holds a predetermined switching condition and uses the switching condition, a switching condition in the delivery node designation information may be omitted. Moreover, in a case where each of the wireless terminals 101 has a table in which a physical IP address, a virtual IP address and a MAC address of the wireless terminal 101 are recorded in association with information specifying the wireless terminal 101 (for example, a node identifier), for example, as shown in FIG. 11 to be described later and, with reference to the table based on information specifying the wireless terminals 101-1 and 101-5 to be switching targets included in the delivery node designation information (for example, a node identifier), can acquire a physical IP address, a virtual IP address and a MAC address, a physical IP address, a virtual IP address and a MAC address of the wireless terminals 101-1 and 101-5 to be switching targets in the delivery designation information may be omitted.

Upon receiving delivery node designation information, the control part 116 of the wireless terminal 101-4 starts periodic switching to make the wireless terminal 101-4 function as a delivery node in intergroup communication between the wireless terminal 101-1 and 101-5. To be specific, the control part 116 periodically performs an operation of, when a time of connection to one of the switching target wireless terminals 101 reaches a switching time designated by the delivery node designation information, terminating the connection and connecting to the other wireless terminal 101 of the switching targets. A disconnection step at step S106 and a connection step at step S107 in FIG. 4 show steps relating to switching first performed by the wireless terminal 101-4 after delivery node designation. The disconnection step and the connection step are executed in a procedure conforming to Wi-Fi Direct between the control part 116 and the control part 114-1 or 114-5 of the two wireless terminals to be connected and disconnected. In FIG. 4, after the above, second switching by the disconnection step at step S113 and the connection step at step S114, third switching by the disconnection step at step S115 and the connection step at step S116, fourth switching by the disconnection step at step S118 and the connection step at step S119, fifth switching by the disconnection step at step S125 and the connection step at step S126, sixth switching by the disconnection step at step S127 and the connection step at step S128, and seventh switching by the disconnection step at step S130 and the connection step at step S131 are performed. Then, in parallel to the switching operation, a packet that is necessary for connection establishment is communicated through the delivery node 101-1 between the wireless terminal 101-1 and the wireless terminal 101-5 in the following manner.

First, the application program 115-1 is executed by the application execution part 111-1 of the wireless terminal 101-1, and a connection establishment request packet is transmitted to the control part 114-1 from the application execution part 111-1 through the virtual network interface 113-1 (steps S103 and S104). The connection establishment request packet is a packet with an IP header added to the front of a TCP header. A port number for identifying the application program 115-1 is set as a transmission source port number in the TCP header, and a port number for identifying the application program 115-5 is set as a destination port number. Moreover, a virtual IP address of the wireless terminal 101-1 is set as a transmission source IP address in the IP header, and a virtual IP address of the wireless terminal 101-5 is set as a destination IP address.

Upon receiving the connection establishment request packet from the application execution part 111-1 through the virtual network interface 113-1, the control part 114-1 of the wireless terminal 101-1, during a period when the delivery node 101-4 is connected to the wireless terminal 101-1, encapsulates the received connection establishment request packet by using an encapsulation header and transmits it to the wireless terminal 101-4 through the physical network interface 112-1 (step S105). In the tunneling at step S105, a header with an IP header added to the front of a UDP header is used as the encapsulation header, a physical IP address of the wireless terminal 101-1 is set as a transmission source IP address in the IP header, and a physical IP address of the wireless terminal 101-4 is set as a destination IP address.

Upon receiving the encapsulated packet from the wireless terminal 101-1 through the physical network interface 112-4, the control part 116 of the wireless terminal 101-4 decapsulates the received encapsulation packet to take the connection establishment request packet, encapsulates the connection establishment request packet again by using an encapsulation header with the physical IP address of the delivery node 101-5 as a destination IP address and, during a period when the wireless terminal 101-5 is connected to the wireless terminal 101-4, transmits the packet to the wireless terminal 101-5 through the physical network interface 112-4 (step S108).

Upon receiving the encapsulated packet from the wireless terminal 101-4 through the physical network interface 112-5, the control part 114-5 of the wireless terminal 101-5 decapsulates the received encapsulation packet to take the connection establishment request packet. Then, the control part 114-5 transmits the connection establishment request packet to the application execution part 115-5 through the virtual network interface 113-5 (steps S109 and S110).

The application execution part 115-5 receives the connection establishment request packet through the virtual network interface 113-5. Consequently, the application program 115-5 of the wireless terminal 101-5 can know that a connection establishment request has been issued by the application program 115-1 of the wireless terminal 101-1.

Next, in order to respond to the abovementioned connection establishment request, a packet including both an acknowledgement in response to the connection establishment request and a connection establishment request (hereinafter, simply referred to as the connection establishment request packet) is transmitted from the application execution part 111-5 of the wireless terminal 101-5 to the control part 114-5 through the virtual network interface 113-5 (steps S111 and S112). This connection establishment request packet is a packet with an IP header added to the front of a TCP header. A port number for identifying the application program 115-5 is set as a transmission source port number in the TCP header, and a port number for identifying the application program 115-1 is set as a destination port number. Moreover, a virtual IP address of the wireless terminal 101-5 is set as a transmission source IP address in the IP header, a virtual IP address of the wireless terminal 101-1 is set as a destination IP address.

Upon receiving the connection establishment request packet from the application execution part 111-5 through the virtual network interface 113-5, the control part 114-5 of the wireless terminal 101-5, during a period when the delivery node 101-4 is connected to the wireless terminal 101-5, encapsulates the received connection establishment request packet by using an encapsulation header and transmits the packet to the wireless terminal 101-4 through the physical network interface 112-5 (step S117). In the tunneling at step S117, a header with an IP header added to the front of a UDP header is used as the encapsulation header, a physical IP address of the wireless terminal 101-5 is set as a transmission source IP address in the IP header, and a physical IP address of the wireless terminal 101-4 is set as a destination IP address.

Upon receiving the encapsulated packet from the wireless terminal 101-5 through the physical network interface 112-4, the control part 116 of the wireless terminal 101-4 decapsulates the received encapsulation packet to take the connection establishment request packet, encapsulates the connection establishment request packet again by using an encapsulation header with the physical IP address of the wireless terminal 101-1 as a destination IP address and, during a period when the wireless terminal 101-1 is connected to the wireless terminal 101-4, transmits the packet to the wireless terminal 101-1 through the physical network interface 112-4 (step S120).

Upon receiving the encapsulated packet from the delivery node 101-4 through the physical network interface 112-1, the control part 114-1 of the wireless terminal 101-1 decapsulates the received encapsulation packet to take the connection establishment request packet. Then, the control part 114-1 transmits the connection establishment request packet to the application execution part 115-1 through the virtual network interface 113-1 (steps S121 and S122).

The application execution part 115-1 receives the connection establishment request packet through the virtual network interface 113-1. Consequently, the application program 115-1 of the wireless terminal 101-1 can receive an acknowledgement and connection establishment request from the application program 115-5.

Next, when an acknowledgement packet is transmitted from the application execution part 111-1 of the wireless terminal 101-1 as a response to the acknowledgement and connection establishment request, this acknowledgement packet is sent to the application execution part 111-5 of the wireless terminal 101-5 by the same procedure as the connection establishment request first transmitted by the application execution part 111-1 (steps S123, S124, S129, and S132 to S134).

Thus, a TCP connection is established between the application program 115-1 running on the wireless terminal 101-1 and the application program 115-5 running on the wireless terminal 101-5 (step S135).

Figure 6:
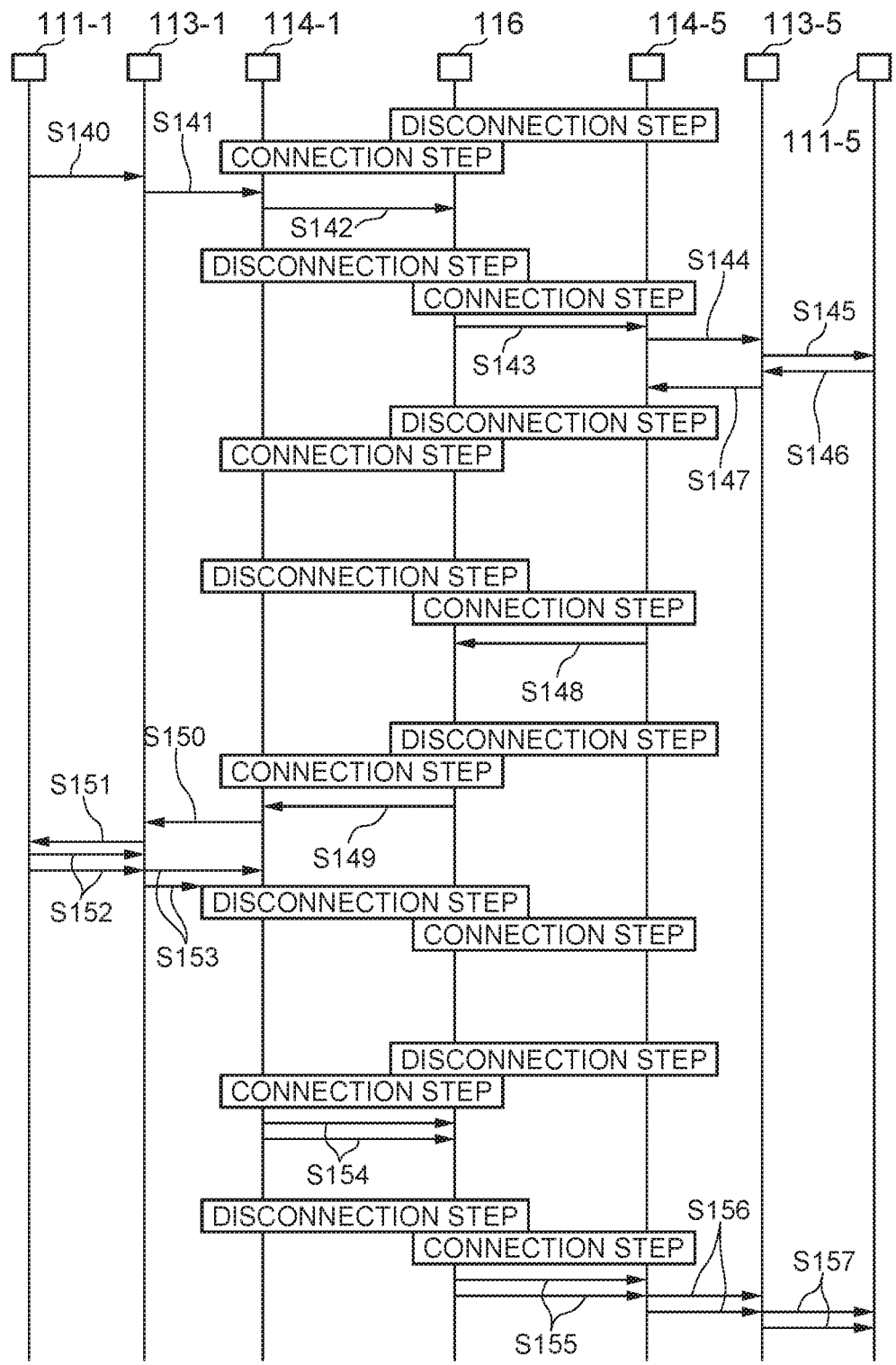
FIG. 6 is a sequence chart showing an example of a procedure for transmitting and receiving data after establishing the TCP connection between the application programs running on the wireless terminals in the first exemplary embodiment of the present invention.

FIG. 6 is a sequence chart showing an example of a procedure for, after establishment of the TCP connection, transmitting and receiving data between the application program 115-1 of the wireless terminal 101-1 and the application program 115-5 of the wireless terminal 101-5. As shown in FIG. 6, the switching operation by the delivery node 101-4 is continued also after establishment of the TCP connection and, in parallel to the switching operation, a packet having application data as a payload (hereinafter, referred to as a data packet) is transmitted and received between the application program 115-1 and the application program 115-5 through the delivery node 101-4.

In the example of FIG. 6, after a TCP connection is established, a first data packet is transmitted from the application program 115-1 to the application program 115-5. Steps S140 and S141 to transmit a data packet from the application execution part 111-1 to the control part 114-1 through the virtual network interface 113-1, step S142 to encapsulate the data packet and transmit from the control part 114-1 to the control part 116 of the delivery node 101-4, step S143 to decapsulate the encapsulated packet received by the control part 116 and encapsulate the packet again to transmit to the control part 114-5 of the wireless terminal 101-5, and steps S144 and S155 to decapsulate the encapsulation packet received by the control part 114-5 and transmit it to the application execution part 111-5 through the virtual network interface 113-5 are different from steps S103 to S105 and steps S108 to S110 of FIG. 4 merely in whether a packet is a data packet or a connection establishment request packet. Therefore, a detailed description thereof will be omitted.

After the TCP connection is established, upon normally receiving the first data packet from the application program 115-1, the application program 115-5 transmits a positive acknowledgement packet in response to the data packet. Steps S146 and S147 to transmit a positive acknowledgement packet from the application execution part 111-5 to the control part 114-5 through the virtual network interface 113-5, step S148 to encapsulate the positive acknowledgement packet and transmit from the control part 114-5 to the control part 116 of the delivery node 101-4, step S149 to decapsulate the encapsulated packet received by the control part 116 and encapsulate the packet again to transmit to the control part 114-1 of the wireless terminal 101-1, and steps S150 and S151 to decapsulate the encapsulation packet received by the control part 114-1 and transmit to the application execution part 111-1 through the virtual network interface 113-1 are different from steps S111 to S112, step S117, and steps S120 to S122 of FIG. 4 merely in whether a packet is a positive acknowledgement packet or an acknowledgement and connection establishment request packet. Therefore, a detailed description thereof will be omitted.

Further, in FIG. 6, upon receiving a positive acknowledgement packet in response to the first data packet from the application program 115-5, the application program 111-1 increases the number of packets or the amount of data that can be sent without waiting for positive acknowledgement, and sequentially transmits a plurality of data packets to the application program 115-5. Each data packet in this case is sent to the application program 111-5 by the same procedure as the steps 140 to S145 (steps S152 to S157).

Thus, data is transmitted and received between the application program 115-1 running on the wireless terminal 101-1 and the application program 115-5 running on the wireless terminal 101-5 through the TCP connection.

Figure 7:
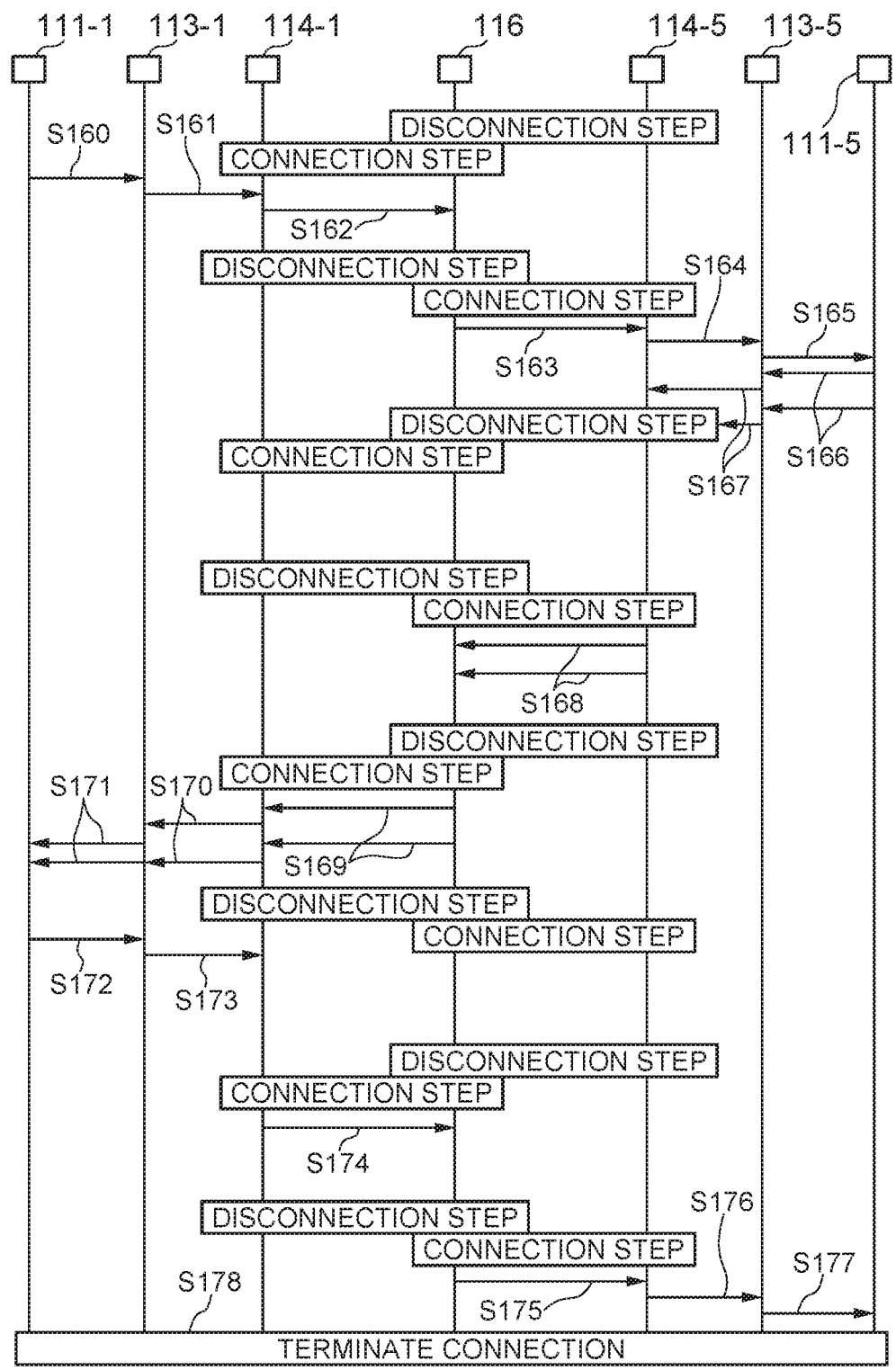
FIG. 7 is a sequence chart showing an example of a procedure for terminating the TCP connection between the application programs running on the wireless terminals in the first exemplary embodiment of the present invention.

FIG. 7 is a sequence chart showing an example of a procedure for terminating a TCP connection between the application program 115-1 of the wireless terminal 101-1 and the application program 115-5 of the wireless terminal 101-5. As shown in FIG. 7, the switching operation by the delivery node 101-4 is still continued and, in parallel to the switching operation, a packet relating to termination of a TCP connection is transmitted and received between the application program 115-1 and the application program 115-5 through the delivery node 101-1.

In the example of FIG. 7, a connection termination request packet is transmitted from the application program 115-1 to the application program 115-5. Steps S160 and S161 to transmit a connection termination packet from the application execution part 111-1 to the control part 114-1 through the virtual network interface 113-1, step S162 to encapsulate the connection termination request packet and transmit from the control part 114-1 to the control part 116 of the delivery node 101-4, step S163 to decapsulate the encapsulation packet received by the control part 116 and encapsulate the packet again to transmit to the control part 114-5 of the wireless terminal 101-5, and steps S164 and S165 to decapsulate the encapsulation packet received by the control part 114-5 and transmit to the application execution part 111-5 through the virtual network interface 113-5 are different from steps S103 to S105 and steps S108 to S110 of FIG. 4 merely in whether a packet is a connection termination request packet or a connection establishment request packet. Therefore, a detailed description thereof will be omitted.

Upon receiving the connection termination request packet from the application program 115-1, the application program 115-5 sequentially transmits an acknowledgement packet in response to the connection termination request and a connection termination request packet. Steps S166 and S167 to transmit the acknowledgement packet and the connection termination request packet from the application execution part 111-5 to the control part 114-5 through the virtual network interface 113-5, step S168 to encapsulate the acknowledgement packet and the connection termination request packet and transmit from the control part 114-5 to the control part 116 of the delivery node 101-4, step S169 to decapsulate the encapsulation packet received by the control part 116 and encapsulate the packet again to transmit to the control part 114-1 of the wireless terminal 101-1, and steps S170 and S171 to decapsulate the packet received by the control part 114-1 and transmit to the application execution part 111-1 through the virtual network interface 113-1 are different from steps S111 to S112, step S117, and steps S120 to S122 of FIG. 4 merely in whether a packet is an acknowledgement and connection termination request packet or a connection establishment request packet. Therefore, a detailed description thereof will be omitted.

Further, upon receiving the acknowledgement packet and the connection termination request packet from the application program 115-5, the application program 111-1 transmits an acknowledgement packet in response to the received connection termination request packet to the application program 115-5. This acknowledgement packet is sent to the application program 111-5 by the same procedure as the procedure at steps S160 to S165 (steps S172 to S177).

Thus, the TCP connection between the application program 115-1 running on the wireless terminal 101-1 and the application program 115-5 running on the wireless terminal 101-5 is terminated (step S178).

Figure 8:
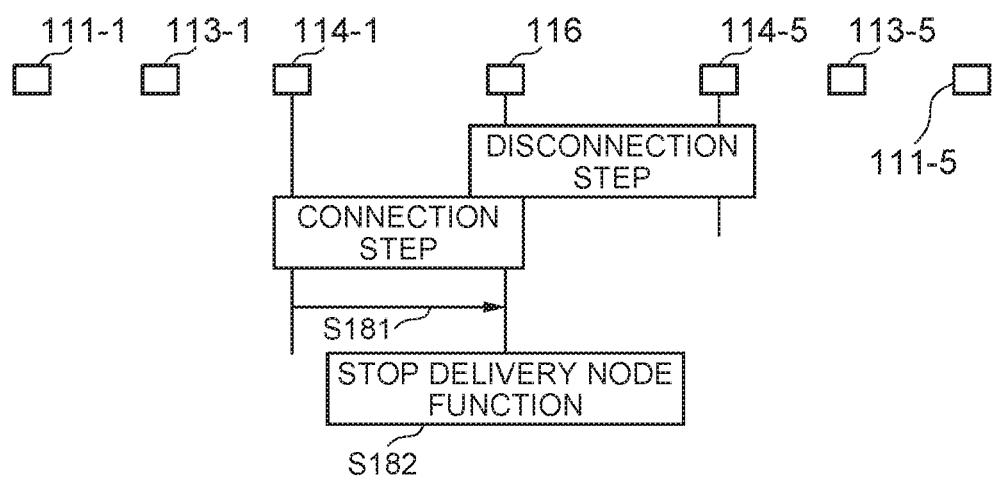
FIG. 8 is a sequence chart showing an example of a procedure for stopping a delivery node function in the first exemplary embodiment of the present invention.

FIG. 8 is a sequence chart showing an example of a procedure for stopping the delivery node function of the wireless terminal 101-4.

In the case of stopping the delivery node function of the wireless terminal 101-4 because of, for example, end of execution of the application program 115-1, the control part 114-1 of the wireless terminal 101-1 transmits delivery node stop information to the delivery node 101-4 (step S181). The delivery node stop information is, for example, transmitted and received between the control part 114-1 of the wireless terminal 101-1 and the control part 116 of the wireless terminal 101-4 by performing TCP communication or UDP communication through the physical interfaces 112-1 and 112-4.

The delivery node stop information includes information that specifies the wireless terminal 101-4 whose delivery node function is to be stopped (for example, a node identifier). Upon receiving the delivery node stop information, the control part 116 of the wireless terminal 101-4 stops control to make the wireless terminal 101-4 function as a delivery node in intergroup communication between the wireless terminal 101-1 and the wireless terminal 101-5 (step S182). Consequently, the wireless terminal 101-4 stops the periodic switching operation.

Next, the control part 114 (the control part 114-1 and the control part 114-5) of the wireless terminal 101 will be described in detail.

Figure 9:
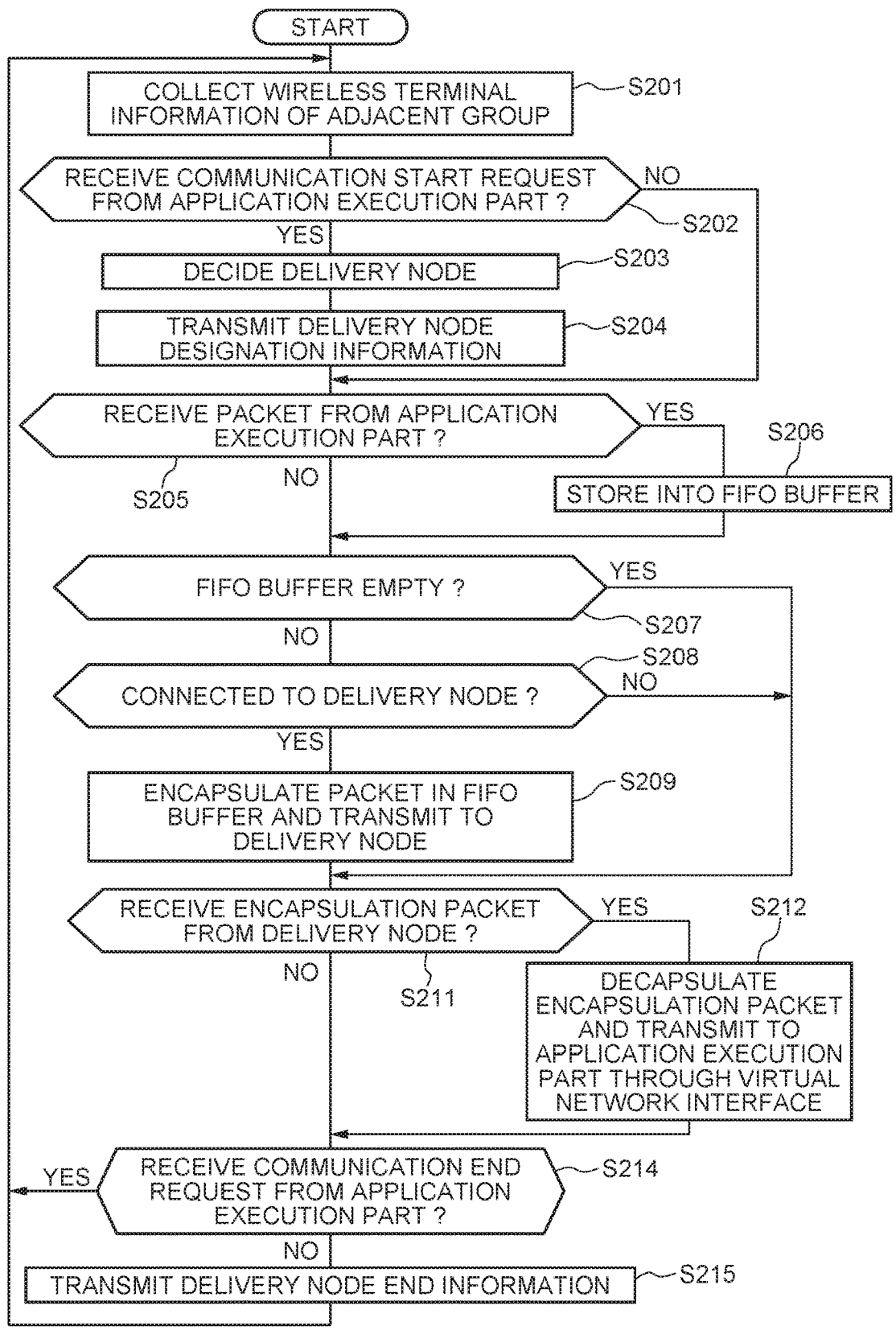
FIG. 9 is a flowchart showing an example of an operation of a control part in the wireless terminal according to the first exemplary embodiment of the present invention.

FIG. 9 is a flowchart showing an example of an operation of the control part 114. Upon started, the control part 114 collects information of a wireless terminal belonging to another neighboring group (step S201). Hereinafter, with reference to FIGS. 10 and 11, the details of step S201 will be described.

Figure 10:
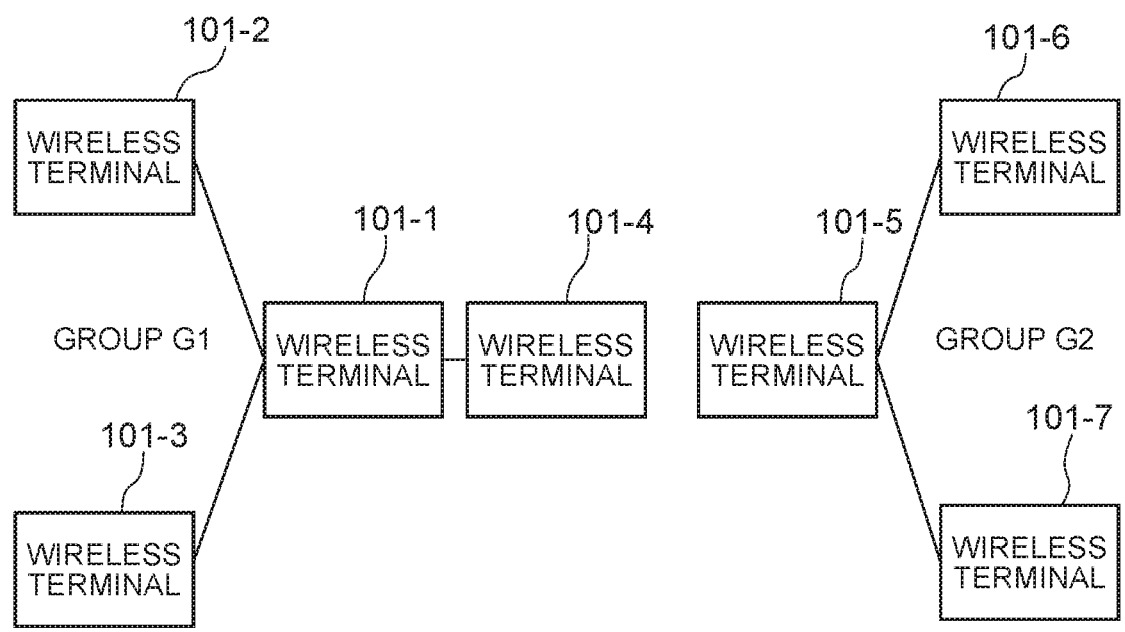
FIG. 10 is an explanation view of an operation to collect information of a wireless terminal belonging to a neighboring group according to the first exemplary embodiment of the present invention.

The following situation will be assumed; as shown in FIG. 10, the group G2 composed of the group owner wireless terminal 101-5 and its client wireless terminals 101-6 and 101-7 is adjacent to the group G1 composed of the group owner wireless terminal 101-1 and its client wireless terminals 101-2 to 101-4. The wireless terminals 101-1 to 101-4 belonging to the group G1 share wireless terminal information, for example, as shown in FIG. 11A, and the wireless terminals 101-5 to 101-7 belonging to the group G2 share wireless terminal information, for example, as shown in FIG. 11B.

The wireless terminal information shown in FIG. 11 includes an entry for each wireless terminal 101. One entry is composed of a node identifier, a MAC address, a physical IP address, a virtual IP address, an owner bit, and a group identifier. A node identifier is a name or the like uniquely identifying the wireless terminal 101. A MAC address, a physical IP address and a virtual IP address are a MAC address, a physical IP address and a virtual IP address set for the wireless terminal. An owner bit is set to a value 1 when the wireless terminal is a group owner, and is set to a value 0 when the wireless terminal is a client. A group identifier is an identifier of a group to which the wireless terminal 101 belongs.

Each of the client wireless terminals 101-2 to 101-4 belonging to the group G1 transmits a probe request for a Device Discovery process and, upon receiving a probe response from the neighboring wireless terminal 101-4 in response to the transmitted probe request, notifies information of the group owner of the group G2 discovered by the probe response to the group owner wireless terminal 101-1. The control part 114 of the wireless terminal 101-1 decides a delivery node to be connected to the group owner 101-5 of the discovered group G2 from among the wireless terminals 101-2 to 101-4. Then, for example, upon deciding the wireless terminal 101-4 as the delivery node, the control part 114 of the wireless terminal 101-1 requests the delivery node 101-4 to temporarily connect to the wireless terminal 101-5 and share wireless terminal information, and disassociates the delivery node 101-4 from the group G1. The delivery node 101-4 disassociated from the group G1 connects to the wireless terminal 101-5 of the group G2, and transmits and receives the wireless terminal information shown in FIG. 11 to and from the wireless terminals 101-5 to 101-7. Next, the delivery node 101-4 disassociates itself from the group G2 to connect to the wireless terminal 101-1 of the group G1, and transmits and receives the wireless terminal information shown in FIG. 11 to and from the wireless terminals 101-1 to 101-3.

Through the operation as described above, the wireless terminals 101-1 to 101-7 of the groups G1 and G2 share the wireless terminal information of the other group shown in FIG. 11.

The above is an example of a detailed operation at step S201 of FIG. 9. Meanwhile, the operation at step S201 of FIG. 9 is not limited to the abovementioned example. For example, in a case where each of the wireless terminals 101 has a cellular communication function such as 3G and LTE other than the Wi-Fi Direct communication function, the wireless terminal information of the groups shown in FIG. 11 may be shared by communication between the wireless terminals by using the cellular communication function.

With reference to FIG. 9 again, the control part 114 of the wireless terminal 101 determines whether or not it has received a communication start request including a virtual IP address of a communication destination from the application execution part 111 (step S202). In the case of having not received a communication start request, the control part 114 skips steps S203 and S204 and proceeds to step S205. In the case of having received a communication start request, the control part 114 decides the wireless terminal 101 to serve as a delivery node from among the clients (step S203), and transmits delivery node designation information to the delivery node (step S204). Then, the control part 114 proceeds to step S205. Delivery node designation information includes, for example, a node identifier that specifies the wireless terminal 101 to become a delivery node, and node identifiers, physical IP addresses, virtual IP addresses, MAC addresses and switching conditions of two wireless terminals 101 to become switching targets. The following description will be made assuming the wireless terminal 101-4 is decided as a delivery node.

At step S205, the control part 114 of the wireless terminal 101 determines whether or not it has received a packet from the application execution part 111-1 through the virtual network interface 113. In the case of having received a packet, the control part 114 stores the received packet into a FIFO buffer in the control part 114 (step S206). Then, the control part 114 proceeds to step S207. In the case of having not received a packet, the control part 114 skips step S206 and proceeds to step S207.

At step S207, the control part 114 of the wireless terminal 101 determines whether or not the FIFO buffer is empty. If the FIFO buffer is empty, the control part 114 proceeds to step S211. If the FIFO buffer is not empty, the control part 114 determines whether or not the wireless terminal 101 is being connected to the delivery node 101 (step S208). If the wireless terminal 101 is not being connected, the control part 114 proceeds to step S211. If the wireless terminal 101 it being connected, the control part 114 encapsulates each packet in the FIFO buffer by using a predetermined encapsulation header, and transmits it to the delivery node 101 through the physical network interface 112 (step S209). Then, the control part 114 proceeds to step S211.

At step S211, the control part 114 of the wireless terminal 101 determines whether or not it has received an encapsulation packet from the delivery node through the physical network interface 112. If not received an encapsulation packet, the control part 114 proceeds to step S214. If received an encapsulation packet, the control part 114 decapsulates the encapsulation packet, and transmits it to the application execution part 111-1 through the virtual network interface 113 (step S212). Then, the control part 114 proceeds to step S214.

At step S214, the control part 114 of the wireless terminal 101 determines whether or not it has received a communication end request from the application execution part 111 through the virtual network interface 113. If not received a communication end request, the control part 114 returns to step S201 to repeat the abovementioned process. If received a communication end request, the control part 114 transmits delivery node end information to the delivery node 101 (step S215). Then, the control part 114 returns to step S201 to repeat the abovementioned process.

The above is the details of the control part 114 (the control part 114-1 and the control part 114-5) of the wireless terminal 101.

Next, the control part 116 of the delivery node 101-4 will be described in detail.

Figure 12:
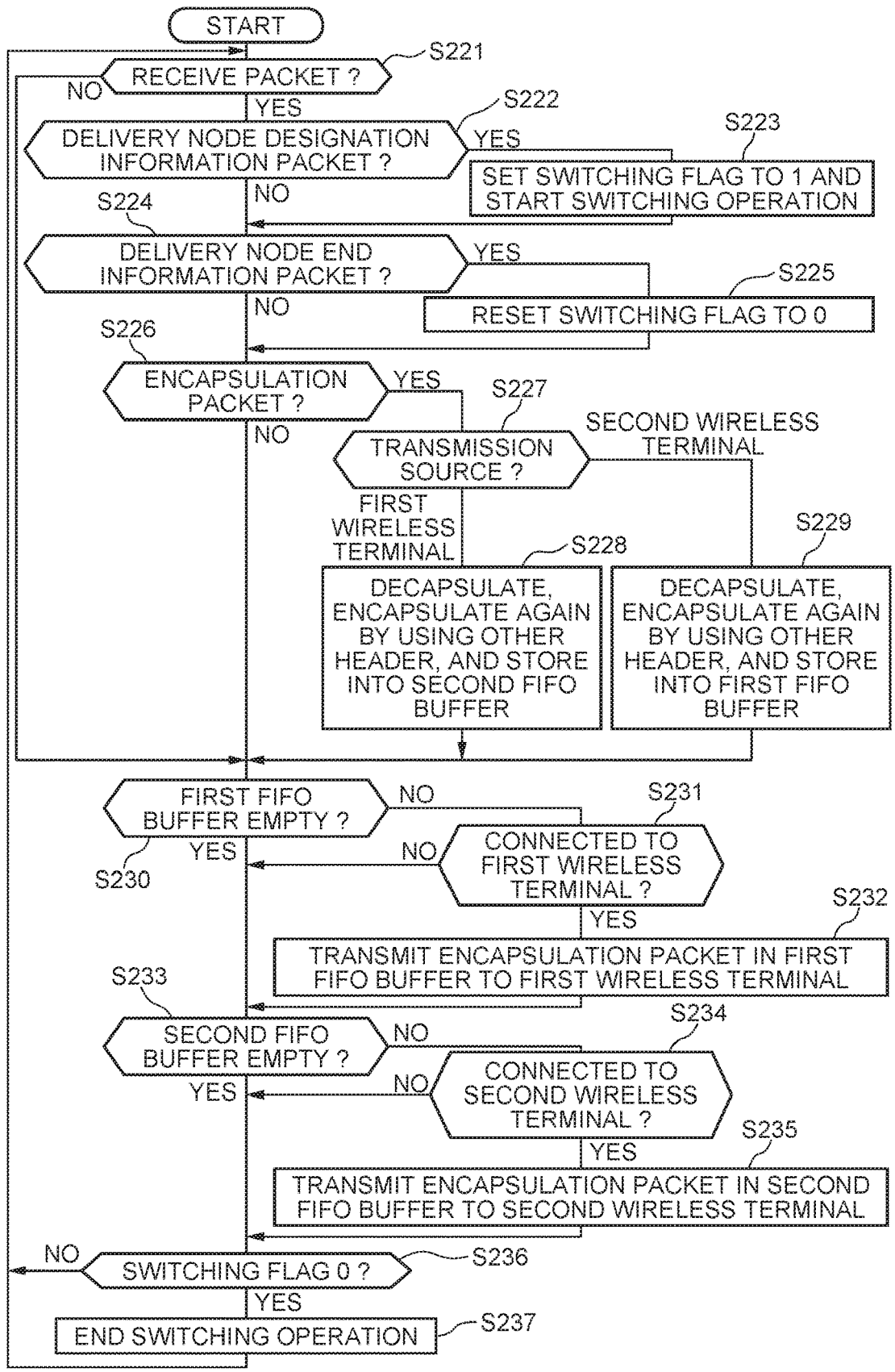
FIG. 12 is a flowchart showing an example of an operation of a control part of the delivery node according to the first exemplary embodiment of the present invention.

FIG. 12 is a flowchart showing an example of an operation of the control part 116 of the delivery node. Upon started, the control part 116 determines whether or not it has received a packet from the physical network interface 112 (step S221). If not received a packet, the control part 116 proceeds to step S230. If received a packet, the control part 116 determines whether or not the received packet is a delivery node designation information packet (step S222). If the packet is not a delivery node designation information packet, the control part 116 proceeds to step S224. If the packet is a delivery node designation information packet, the control part 116 sets an internal switching flag to 1 and starts a periodic switching operation according to delivery node designation information (step S223). Then, the control part 116 proceeds to step S224.

Figure 13:
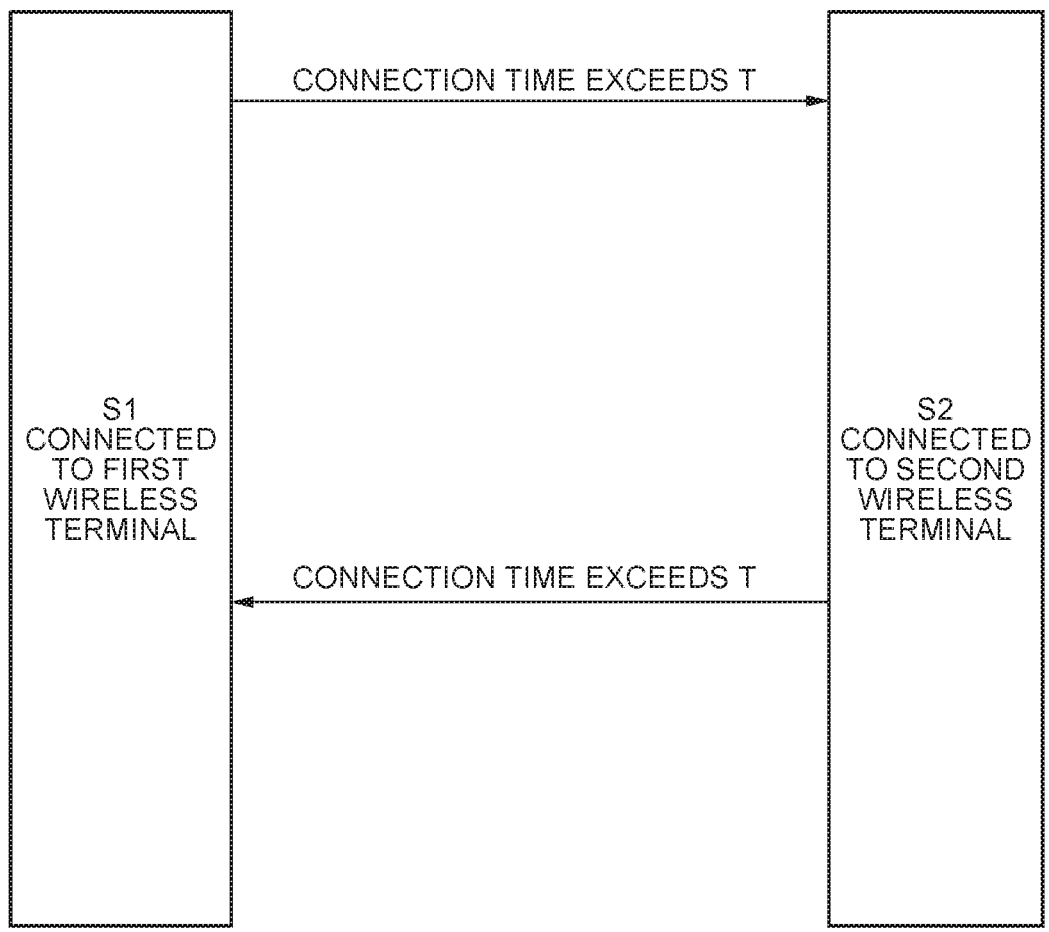
FIG. 13 is a state transition view for describing a switching operation of the delivery node according to the first exemplary embodiment of the present invention.

FIG. 13 is a state transition view for describing the switching operation of the delivery node. Assuming one of the two switching targets designated by the delivery node designation information is a first wireless terminal and the other is a second wireless terminal, when a switching time designated by a delivery node condition of the delivery node designation information has passed in a state S1 where the delivery node is connected to the first wireless terminal, the control part 116 of the delivery node terminates the connection with the first wireless terminal to connect to the second wireless terminal and transits to a state S2 where the delivery node is connected to the second wireless terminal. Moreover, when the switching time designated by the delivery node condition has passed in the state S2 where the delivery node is connected to the second wireless terminal, the control part 116 terminates the connection with the second wireless terminal to connect to the first wireless terminal and transits to the state S1 where the delivery node is connected to the first wireless terminal.

At step S224, the control part 116 of the delivery node determines whether or not the received packet is a delivery node end information packet. If the packet is not a delivery node end information packet, the control part 116 proceeds to step S226. If the packet is a delivery node end information packet, the control part 116 resets the switching flag to 0 (step S225) and proceeds to step S226.

At step S226, the control part 116 of the delivery node determines whether or not the received packet is an encapsulation packet. If the packet is not an encapsulation packet, the control part 116 proceeds to step S230. If the packet is an encapsulation packet, the control part 116 determines whether a transmission source of the encapsulation packet is the first wireless terminal or the second wireless terminal of the two switching targets (step S227). Next, if the transmission source is the first wireless terminal, the control part 116 encapsulates a packet obtained by decapsulating the encapsulation packet again by using a predetermined encapsulation header with a physical IP address of the second wireless terminal as a destination IP address, and stores it into a second FIFO buffer in the control part 116 (step S228), and proceeds to step S230. Moreover, the control part 116 encapsulates a packet obtained by decapsulating the encapsulation packet again by using a predetermined encapsulation header with a physical IP address of the first wireless terminal as a destination IP address, and stores it into a first FIFO buffer in the control part 116 (step S229), and proceeds to step S230.

At step S230, the control part 116 of the delivery node determines whether or not the first FIFO buffer is empty. If empty, the control part 116 proceeds to step S233. If not empty, the control part 116 determines whether or not the delivery node is being connected to the first wireless terminal (step S231). If not being connected, the control part 116 proceeds to step S233. If being connected, the control part 116 sequentially takes out all encapsulation packets from the first FIFO buffer, and transmits the packets to the first wireless terminal through the physical network interface 112 (step S232), and proceeds to step S233.

At step S233, the control part 116 of the delivery node determines whether or not the second FIFO buffer is empty. If empty, the control part 116 proceeds to step S236. If not empty, the control part 116 determines whether or not the delivery node is being connected to the second wireless terminal (step S234). If not being connected, the control part 116 proceeds to step S236. If being connected, the control part 116 sequentially takes out all encapsulation packets from the second FIFO buffer, and transmits the packets to the second wireless terminal through the physical network interface 112 (step S235), and proceeds to step S236.

At step S236, the control part 116 of the delivery node determines whether or not the switching flag is 0. If not 0, the control part 116 returns to step S221 to repeat the abovementioned process. If 0, the control part 116 confirms that the first and second FIFO buffers are empty, and stops the switching operation of the delivery node (step S237). Then, the control part 116 returns to step S221 to repeat the abovementioned process.

The above is the details of the control part 116 of the delivery node 101-4.

Next, a Wi-Fi Direct connection and disassociation function of the wireless terminal 101 will be described with reference to FIGS. 14 to 20.

A Wi-Fi control connection part shown in FIGS. 15 to 20 is a block that generates a Wi-Fi Direct packet to transmit through the physical network interface 112 and also receives a Wi-Fi Direct packet through the physical network interface 112. The Wi-Fi connection control part executes control in unit such as "Device Discovery," "Group Formation," "WPS (Wi-Fi Protected Setup) Provisioning Phase 1" and "WPS Provisioning Phase 2." Moreover, the Wi-Fi connection control part receives an event (a command) from an automatic connection control part to start control, and notifies the result as an event (a response) to the automatic connection control part.

Further, the automatic connection control part is a control part located in an upper hierarchy than the Wi-Fi connection control part. The automatic connection control part controls the Wi-Fi connection control part, thereby realizing automatic connection by Wi-Fi Direct. To be specific, for example, when wireless terminals come close to each other, the automatic connection control part forms one group and realizes communication between the wireless terminals in the group. Moreover, when a new wireless terminal comes close to an already formed group, the automatic connection control part automatically participates in the already formed group. Besides, the automatic connection control part automatically disassociates a wireless terminal from the already formed group.

Herein, the Wi-Fi connection control part and the automatic connection control part may be implemented in the control part 114, 116 of the wireless terminal 101, or may be implemented outside the control part 114, 116. In FIGS. 15 to 20, a wireless terminal is described as a node.

<Wi-Fi Direct Connection and Disassociation>

Figure 14:
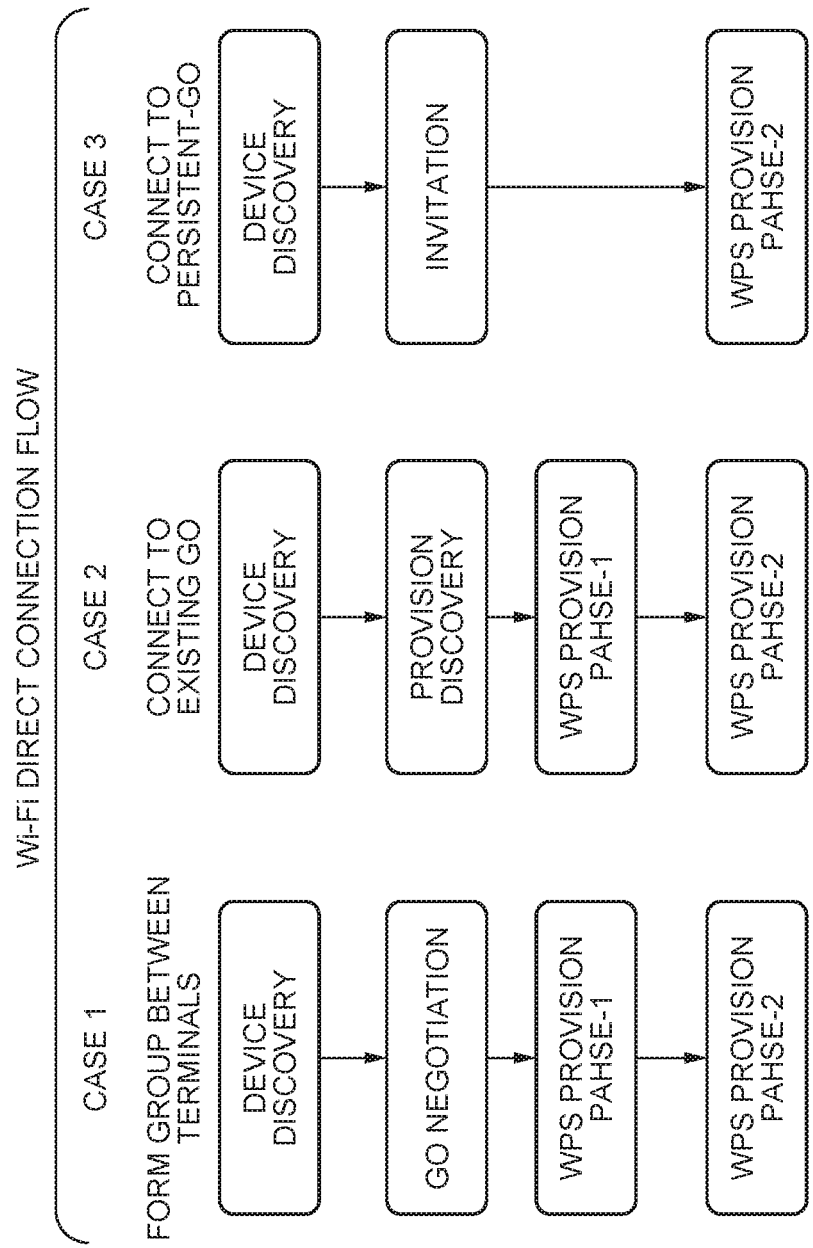
FIG. 14 is a view showing a connection flow of Wi-Fi Direct used in the communication system according to the first exemplary embodiment of the present invention.

As shown in FIG. 14, in the case of forming a group between wireless terminals (CASE 1), firstly, the wireless terminal searches for a neighboring wireless terminal (a P2P node) by Device Discovery process and, when a neighboring wireless terminal is discovered, one of the wireless terminals becomes a group owner (GO) and the other becomes a client by GO Negotiation process, and the wireless terminals connect to each other. Subsequently, WPS Provision Phase-1 (an authentication phase) and WPS Provision Phase-2 (an encoding phase) are subsequently executed.

In the case of connecting to an existing GO (CASE 2), firstly, the wireless terminal searches for a neighboring wireless terminal (a P2P node) by Device Discovery process and, if the discovered wireless terminal is GO, the wireless terminal connects to the GO by Provision Discovery process, and subsequently, WPS Provision Phase-1 (an authentication phase) and WPS Provision Phase-2 (an encoding phase) are subsequently executed.

In the case of connecting to a Persistent GO (CASE 3), firstly, the wireless terminal searches for a neighboring wireless terminal (a P2P node) by Device Discovery process and, if the discovered wireless terminal is a Persistent GO, the wireless terminal connects to the Persistent GO by Invitation process, and subsequently, WPS Provision Phase-2 (an encoding phase) is subsequently executed.

Figure 15:
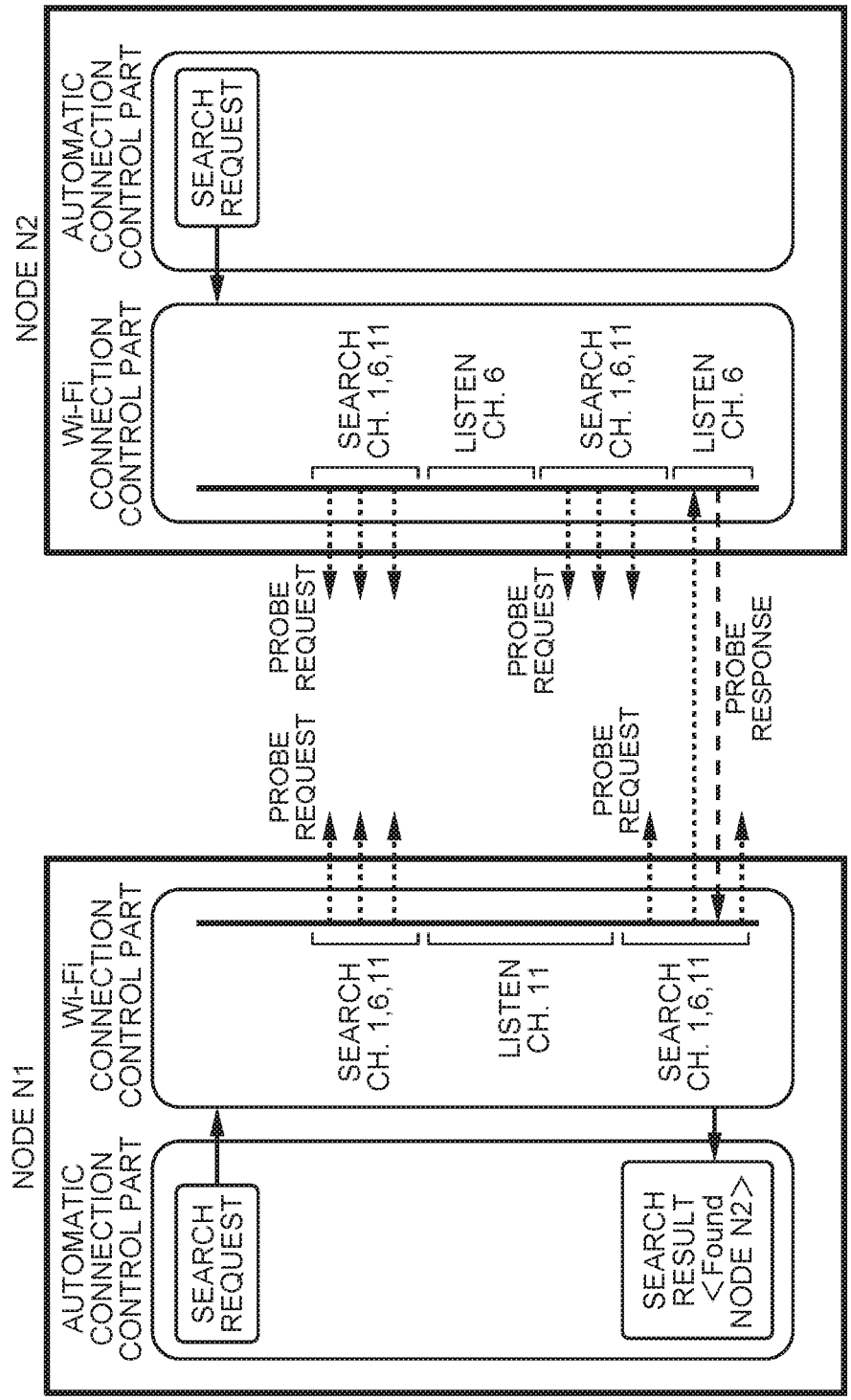
FIG. 15 is a view showing an operation flow of DEVICE DISCOVERY in Wi-Fi Direct used in the communication system according to the first exemplary embodiment of the present invention.

As illustrated in FIG. 15, a Device Discovery operation is executed. That is, upon receiving a search request from the automatic connection control part, the Wi-Fi connection control part in each wireless terminal starts searching for a neighboring wireless terminal, and alternately comes into a Search state and a Listen state. In the Search state, the Wi-Fi connection control part sends out a Probe Request while sequentially switching predetermined channels, and waits for a Probe Response that is a response to the request. In the Listen state, the Wi-Fi connection control part waits for a Probe Request from the other node and, upon receiving a Probe Request, returns a Probe Response to the request. In a case where a wireless terminal N1 is a client of a group, when the Wi-Fi connection control part of the wireless terminal N1 receives a Probe Response from a wireless terminal N2, the Wi-Fi connection control part notifies information of the neighboring wireless terminal N2 as neighboring node information to a group owner of the group.

Figure 16:
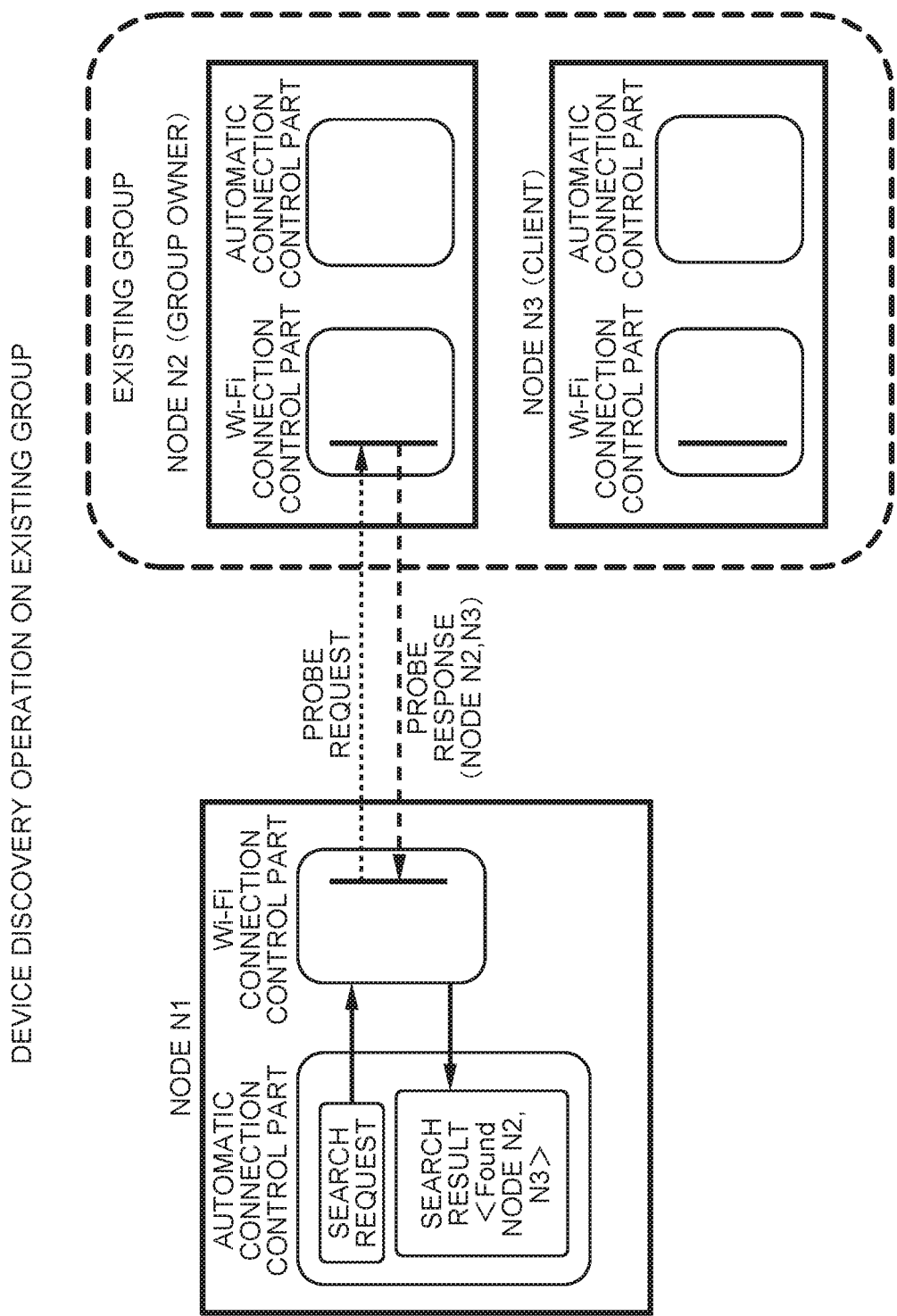
FIG. 16 is a view showing an operation flow of DEVICE DISCOVERY used in discovering an existing group in Wi-Fi Direct used in the communication system according to the first exemplary embodiment of the present invention.

As illustrated in FIG. 16, a Device Discovery operation on an existing GO is executed. In a case where a group with the wireless terminal N2 as a group owner has already been structured, the GO wireless terminal N2 returns a Probe Response to a Probe Request from the wireless terminal N1. In this case, in the P2P Device Info Attribute of the Probe Response from the GO wireless terminal N2, a list of clients belonging to the group (herein, information of the nodes N2 and N3) is included.

Figure 17:
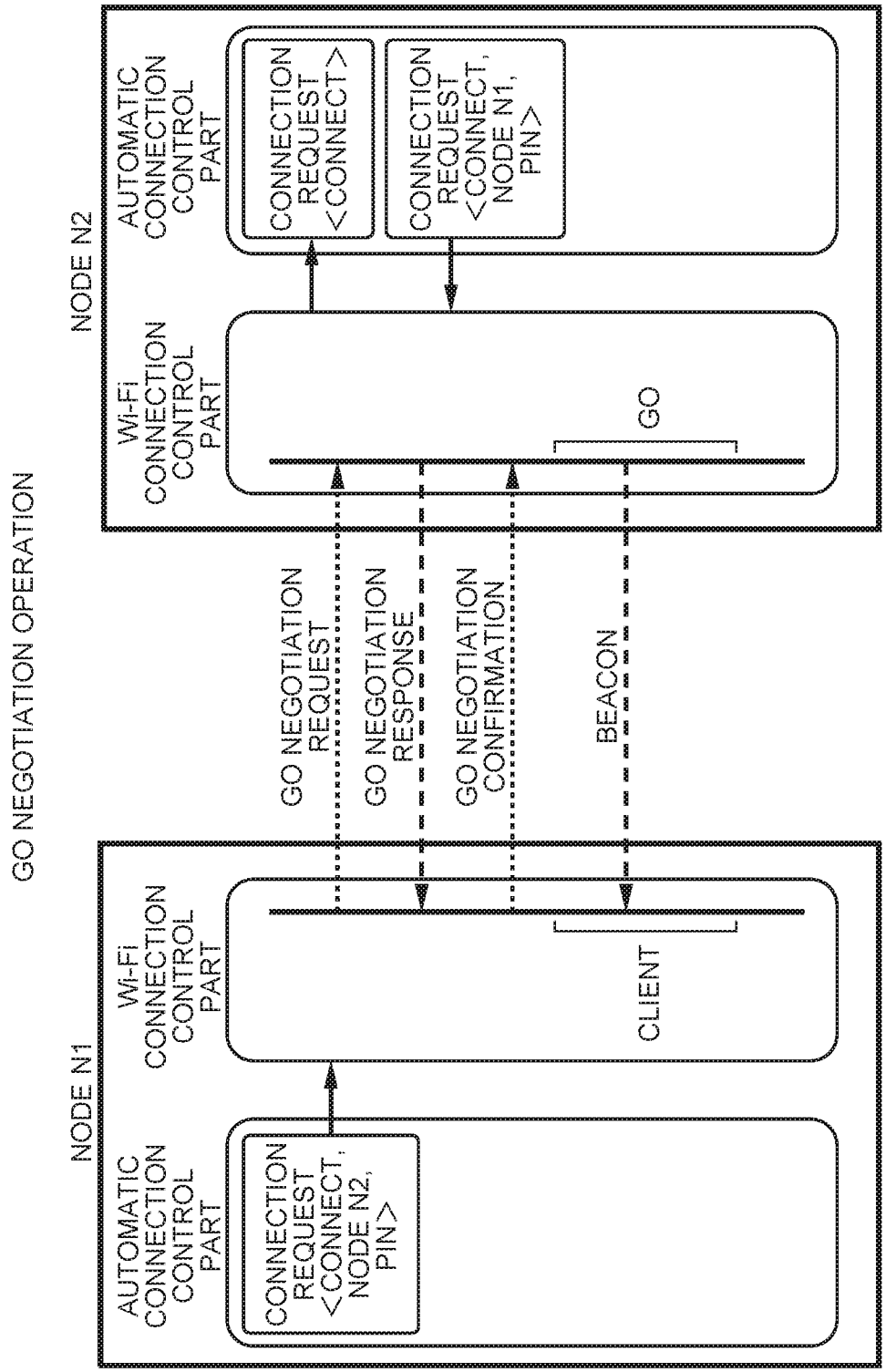
FIG. 17 is a view showing an operation flow of GO NEGOTIATION in Wi-Fi Direct used in the communication system according to the first exemplary embodiment of the present invention.

As illustrated in FIG. 17, a GO Negotiation operation at the time of forming a group between wireless terminals is executed. By transmitting and receiving a GO Negotiation Request, a GO Negotiation Response and a GO Negotiation Confirmation, one of the wireless terminals becomes a GO and starts broadcasting a beacon.

Figure 18:
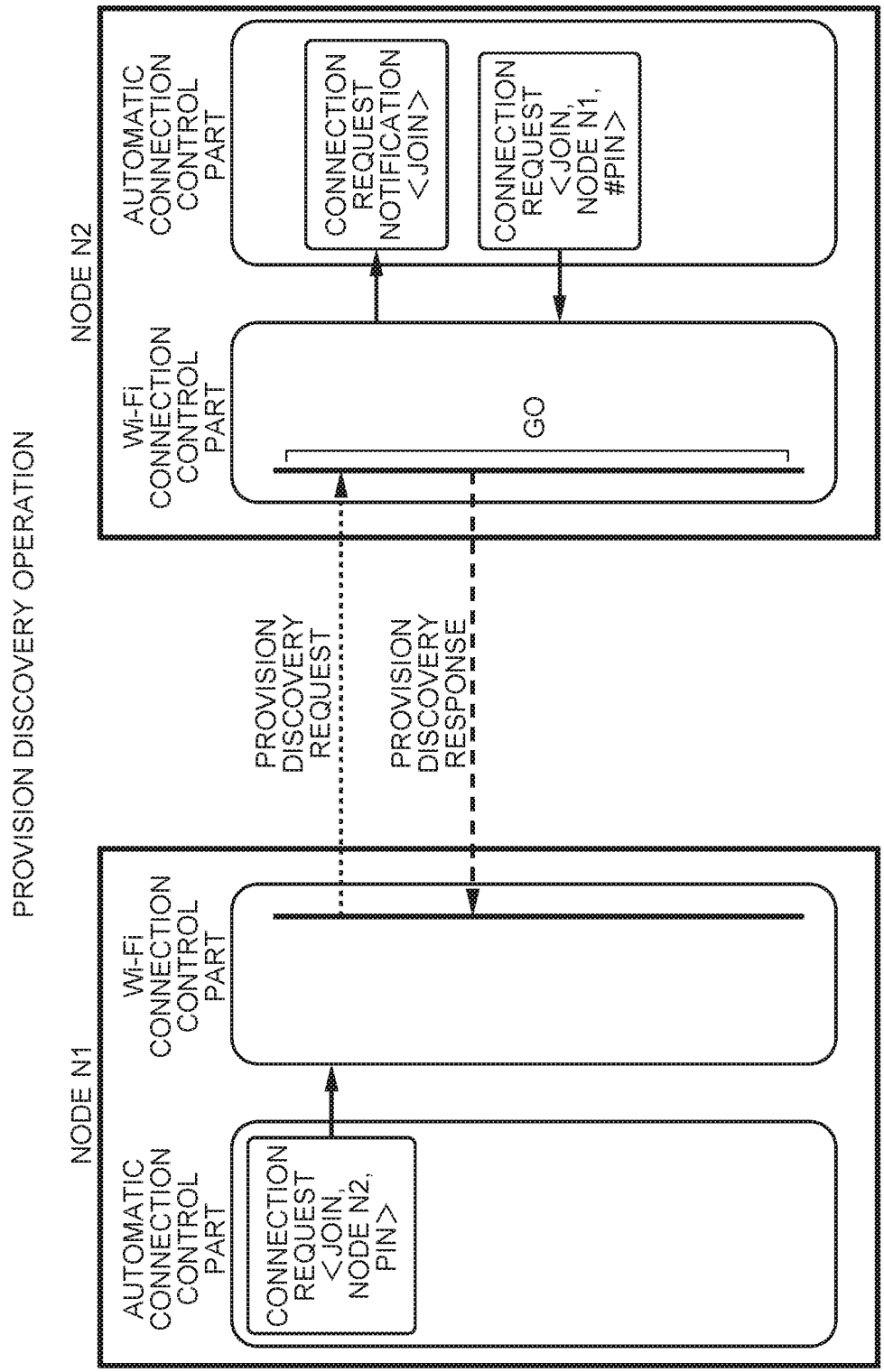
FIG. 18 is a view showing an operation flow of PROVISION DISCOVERY in Wi-Fi Direct used in the communication system according to the first exemplary embodiment of the present invention.

As illustrated in FIG. 18, a Provision Discovery operation for connecting to an existing GO is executed. In response to a Provision Discovery Request from the wireless terminal N1 to the wireless terminal N2, the GO wireless terminal N2 returns a Provision Discovery Response to the wireless terminal N1, whereby the wireless terminal N1 is connected to the wireless terminal N2.

Figure 19:
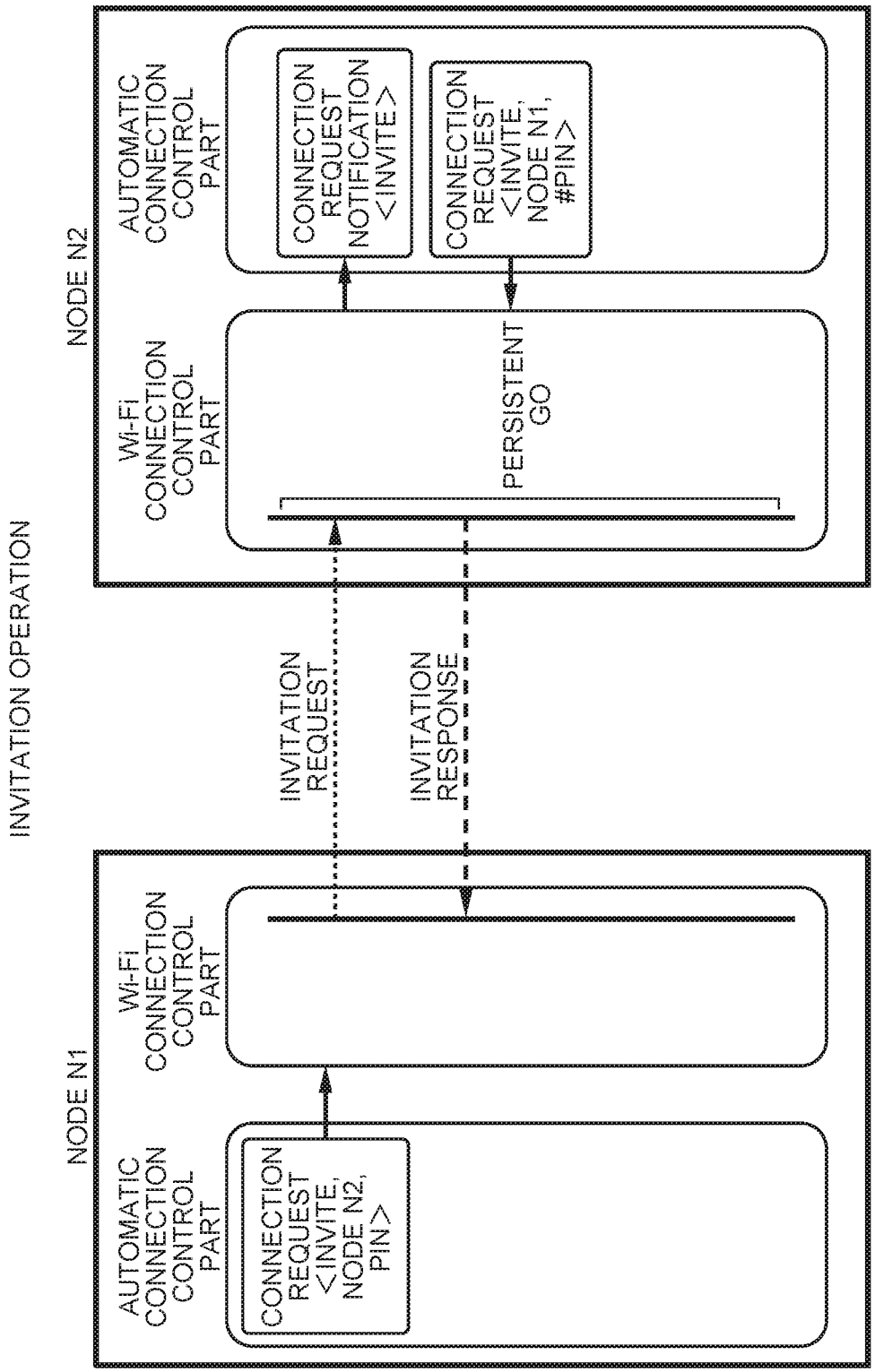
FIG. 19 is a view showing an operation flow of INVITATION in Wi-Fi Direct used in the communication system according to the first exemplary embodiment of the present invention.

As illustrated in FIG. 19, an Invitation operation for connecting to a Persistent-GO is executed. In response to an Invitation Request from the wireless terminal N1 to the wireless terminal N2, the Persistent-GO wireless terminal N2 returns an Invitation Response to the wireless terminal N1, whereby the wireless terminal N1 is connected to the wireless terminal N1.

Figure 20:
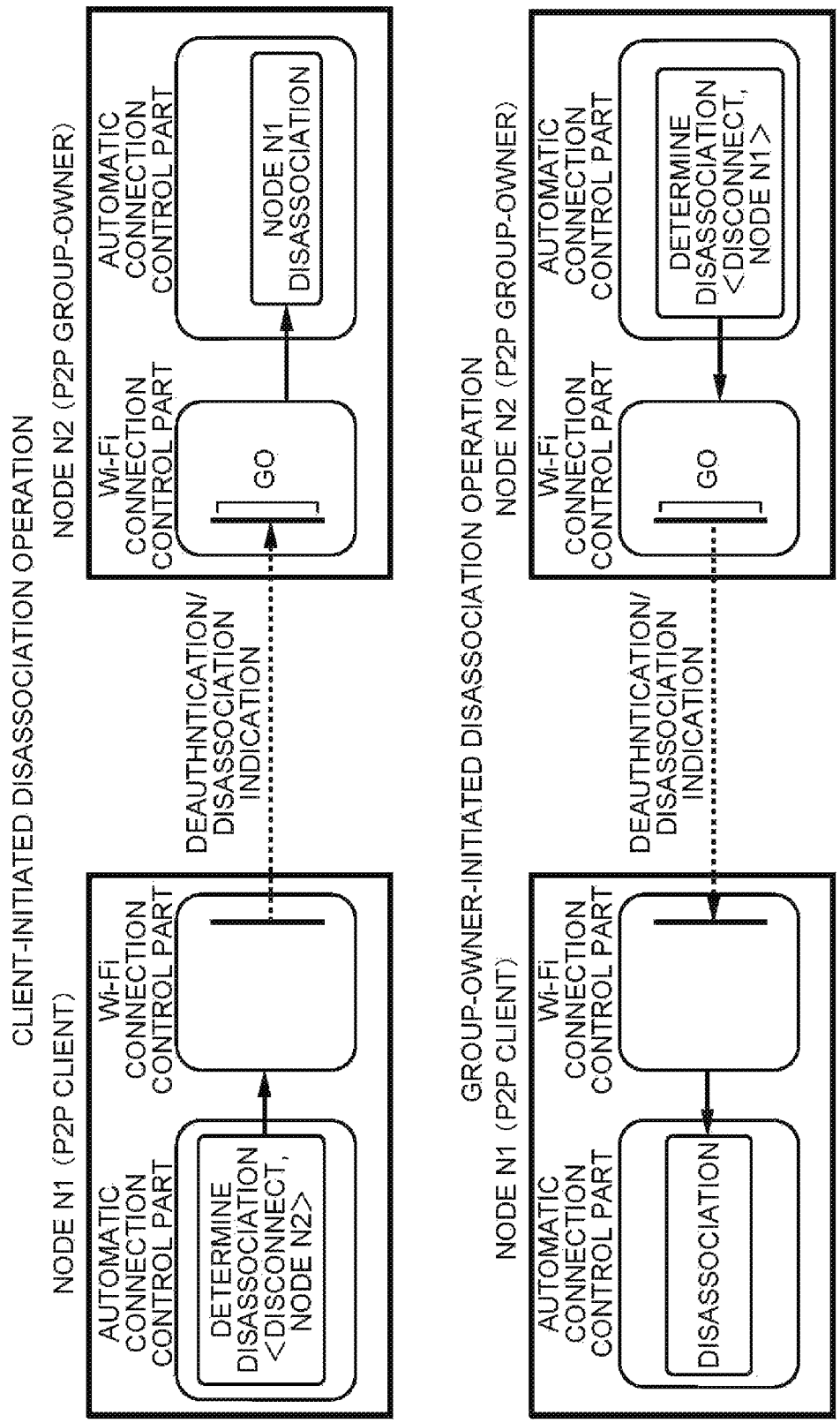
FIG. 20 is a view showing an operation flow of node disassociation in Wi-Fi Direct used in the communication system according to the first exemplary embodiment of the present invention.

As shown in FIG. 20, in client-initiated disassociation, the client wireless terminal N1 transmits Deauthentication or Disassociation Indication to the GO wireless terminal N2, whereby the client can be disassociated. On the contrary, in group-owner-initiated disassociation, the GO wireless terminal N2 transmits Deauthentication or Disassociation Indication to the wireless terminal N1 of the client, whereby the client can be disassociated.

As described above, according to this exemplary embodiment, communication can be made directly between the application program 115-1 running on the wireless terminal 101-1 belonging to the group G1 and the application program 115-5 running on the wireless terminal 101-5 belonging to the group G2 through the delivery node 101-4. This is because a virtual IP address is set for each of the wireless terminal 101-1 and the wireless terminal 101-5, communication between the application program 115-1 and the application program 115-5 is performed with the use of a packet using the virtual IP address and, in a communication path between the wireless terminal 101-1, 101-5 and the delivery node 101-4 where a packet with the virtual IP address as a destination address cannot directly pass, the packet is encapsulated by using an encapsulation header with a physical IP address as a destination IP address and passed. Moreover, this is because, considering that the wireless terminal 101-1 and the wireless terminal 101-5 are not exclusively connected through the delivery node but intermittently connected, tunneling between the wireless terminal 101-1 and the wireless terminal 101-5 is separated into tunneling between the wireless terminal 101-1 and the delivery node 101-4 and tunneling between the delivery node 101-4 and the wireless terminal 101-5.

Thus, it is possible to perform TCP/IP communication directly between application programs, so that it is possible to perform communication across groups without modifying an existing application program. Moreover, tethering with a plurality of wireless communications hopped can be realized.

Further, according to this exemplary embodiment, it is possible to perform reliable communication between the application program 115-1 and the application program 115-5. This is because TCP/IP communication using TCP as a protocol of a transport layer is performed between the application program 115-1 and the application program 115-5.

Second Exemplary Embodiment

Next, a communication system according to a second exemplary embodiment of the present invention will be described.

When the communication system according to this exemplary embodiment is compared with the communication system according to the first exemplary embodiment, a switching operation of a delivery node is different from that of the communication system according to the first exemplary embodiment, and the other configuration and operation are the same.

Figure 21:
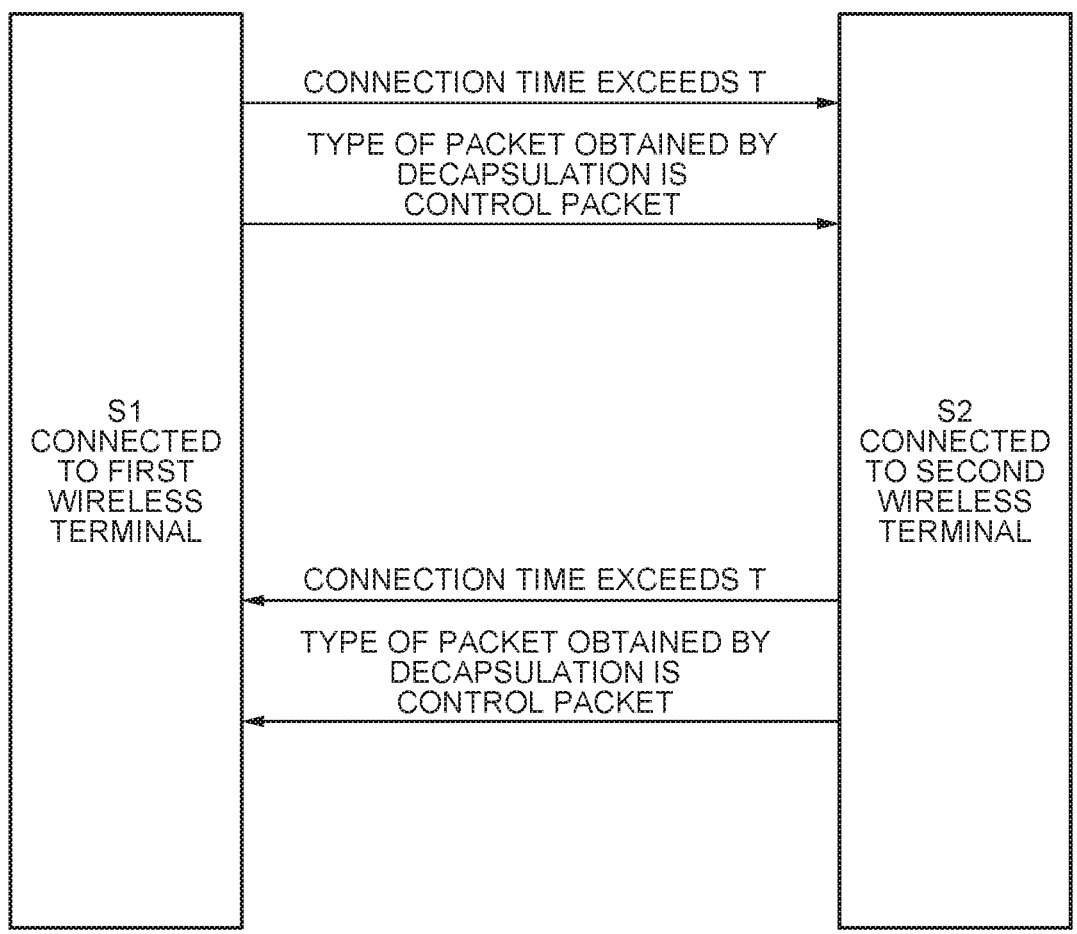
FIG. 21 is a state transition view for explaining a switching operation of a delivery node according to a second exemplary embodiment of the present invention.

FIG. 21 is a state transition view for describing a switching operation of the delivery node 101-4 in this exemplary embodiment. Assuming one of two switching targets designated by the delivery node designation information is a first wireless terminal and the other is a second wireless terminal, in a state S1 where the delivery node is connected to the first wireless terminal, the control part 116 of the delivery node terminates the connection with the first wireless terminal to connect to the second wireless terminal and transits to a state S2 where the delivery node is connected to the second wireless terminal, subject to either established earlier; a switching time designated by a delivery node condition of the delivery node designation information has passed, or the type of a packet obtained by decapsulating an encapsulation packet received from the first wireless terminal is a control packet.

Moreover, in the state S2 where the delivery node is connected to the second wireless terminal, the control part 116 of the delivery node terminates the connection with the second wireless terminal to connect to the first wireless terminal and transits to the state S1 where the delivery node is connected to the first wireless terminal, subject to either established earlier; the switching time designated by the delivery node condition has passed, or when the type of a packet obtained by decapsulating an encapsulation packet received from the second wireless terminal is a control packet.

Herein, the abovementioned control packet may be, for example, one, two, three, four or five of a connection establishment request packet used for TCP connection management, an acknowledgement and connection establishment request packet in response to the connection establishment request packet, an acknowledgement packet in response to the acknowledgement and connection establishment request packet, a connection termination request packet, and an acknowledgement packet in response to the connection termination request packet. Moreover, the control packet may be a positive acknowledgement packet or a negative acknowledgement packet in response to a data packet.

Figure 22:
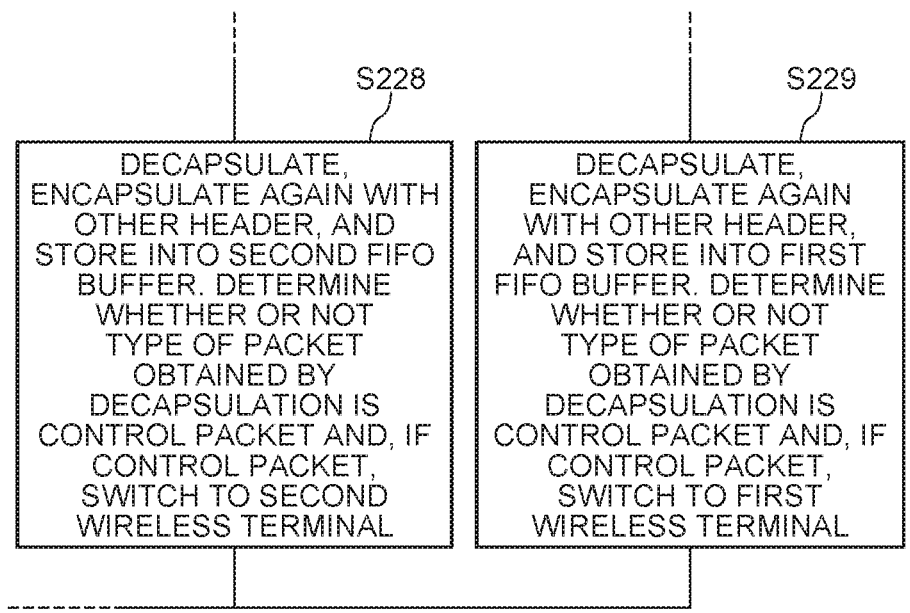
FIG. 22 is a flowchart showing an example of an essential part of an operation of a control part of the delivery node according to the second exemplary embodiment of the present invention.

In this exemplary embodiment, steps S228 and S229 in the flowchart of FIG. 12 showing an example of the operation of the control part 116 of the delivery node are changed to those shown in FIG. 22. The steps other than steps S228 and S229 are the same as those in FIG. 12.

With reference to FIG. 22, at step S228 executed upon receiving an encapsulation packet from the first wireless terminal, the control part 116 of the delivery node performs the following operation in addition to the operation of decapsulating the received encapsulation packet, encapsulating again and storing into the second FIFO. The control part 116 determines whether or not the type of the packet obtained by decapsulation is a control packet and, if the type is a control packet, immediately executes switching to disconnect the delivery node from the first wireless terminal and connect to the second wireless terminal.

Further, at step S229 executed upon receiving an encapsulation packet from the second wireless terminal, the control part 116 of the delivery node performs the following operation in addition to the operation of decapsulating the received encapsulation packet, encapsulating again and storing into the first FIFO. The control part 116 determines whether or not the type of the packet obtained by decapsulation is a control packet and, if the type is a control packet, executes switching to disconnect the delivery node from the second wireless terminal and connect to the first wireless terminal.

By performing the operation as described above, it is possible to, when receiving a control packet from the first wireless terminal in a state where the delivery node is connected to the first wireless terminal, immediately connect the delivery node to the second wireless terminal and transmit the received control packet to the second wireless terminal. Moreover, it is possible to, when receiving a control packet from the second wireless terminal in a state where the delivery node is connected to the second wireless terminal, immediately connect the delivery node to the first wireless terminal and transmit the received control packet to the first wireless terminal. Its effect will be described below with establishment of a TCP connection taken as an example. However, the same effect can be obtained not only at the time of establishment of a TCP connection, but also at the time of termination of a TCP connection and at the time of transmission of positive acknowledgement or negative acknowledgement in response to a data packet.

Figure 23:
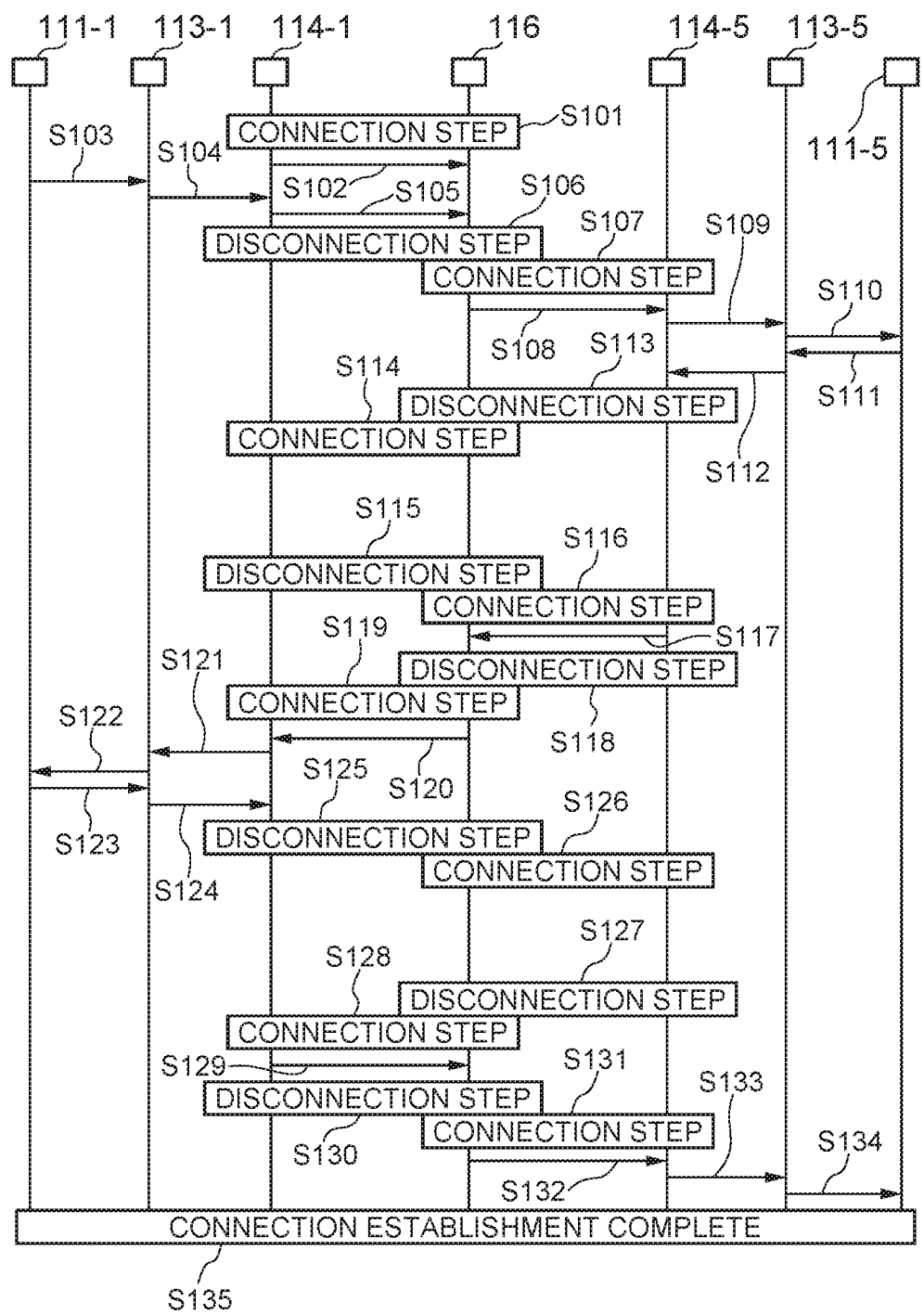
FIG. 23 is a sequence chart showing an example of a procedure for establishing a TCP connection between application programs running on wireless terminals in the second exemplary embodiment of the present invention.

FIG. 23 is a sequence chart showing an example of a procedure to establish a TCP connection between the application program 115-1 running on the wireless terminal 101-1 and the application program 115-5 running on the wireless terminal 101-5 through the delivery node 101-4. In FIG. 23, the same procedures as in FIG. 4 are denoted by the same step numbers.

With reference to FIG. 23, a connection establishment request packet is transmitted to the control part 114-1 from the application execution part 111-1 of the wireless terminal 101-1 through the virtual network interface 113-1 (steps S103 and S104). The connection establishment request packet is encapsulated with the use of an encapsulation header and transmitted to the control part 116 of the delivery node 101-4 from the control part 114-1 (step S105). At step S228 of FIG. 22, the control part 116 of the delivery node 101-4 decapsulates the received encapsulation packet to take the connection establishment request packet, encapsulates the connection establishment request packet again with the use of an encapsulation header, and stores it into the second FIFO buffer. Moreover, because the packet obtained by decapsulation is a control packet, the control part 116 executes the disconnection step S106 and the disconnection step S107 in order to immediately connect the delivery node 101-4 to the wireless terminal 101-5 serving as the second wireless terminal. As a result, the control part 116 can immediately transmit the connection establishment request packet encapsulated again to the control part 114-5 of the wireless terminal 101-5 (step S108).

In FIG. 23, upon receiving an acknowledgement and connection establishment request packet in response to the connection establishment request packet from the wireless terminal 101-5 by tunneling (step S117), the control part 116 of the delivery node 101-4 performs switching without waiting until the switching time T passes (steps S118 and S119), and transmits the acknowledgement and connection establishment request packet to the wireless terminal 101-1 by tunneling (step S120). Moreover, upon receiving an acknowledgement packet in response to the acknowledgement and connection establishment request packet from the wireless terminal 101-1 by tunneling (step S129), the control part 116 of the delivery node 101-4 performs switching without waiting until the switching time T passes (steps S130 and S131), and transmits the acknowledgement packet to the wireless terminal 101-5 by tunneling (step S132).

Thus, according to this exemplary embodiment, it is possible to control a timing for switching by the delivery node 101-4 in accordance with the type of a packet transmitted by tunneling, so that efficient switching is possible.

Third Exemplary Embodiment

Next, a communication system according to a third exemplary embodiment of the present invention will be described.

Figure 24:
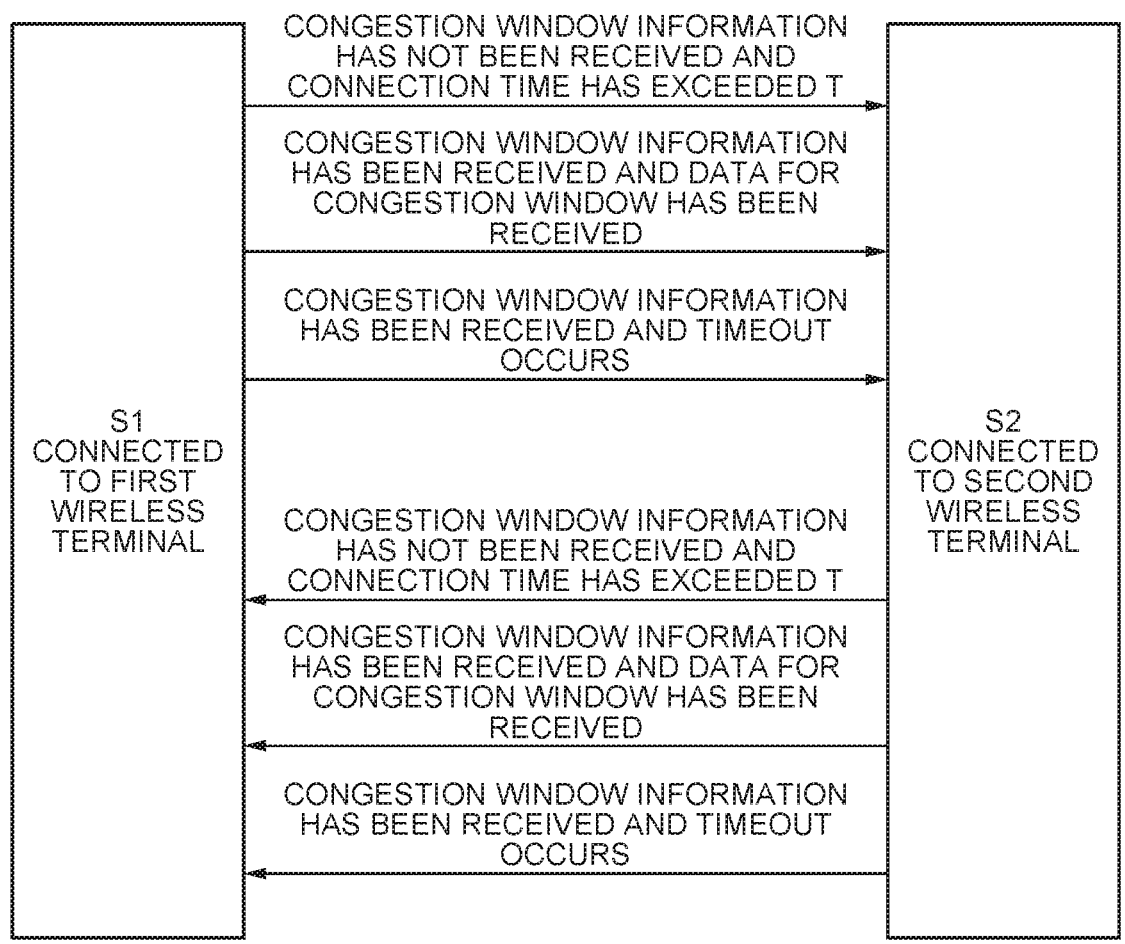
FIG. 24 is a state transition view for explaining a switching operation of a delivery node according to a third exemplary embodiment of the present invention.

FIG. 24 is a state transition view for describing a switching operation of the delivery node 101-4 in this exemplary embodiment. Assuming one of two switching targets designated by the delivery node designation information is a first wireless terminal and the other is a second wireless terminal, in a state S1 where the delivery node is connected to the first wireless terminal, the control part 116 of the delivery node terminates the connection with the first wireless terminal to connect to the second wireless terminal and transits to a state S2 where the delivery node is connected to the second wireless terminal, subject to any established earliest; a switching time designated by a delivery node condition of the delivery node designation information has passed before reception of congestion window information from the first wireless terminal, or congestion window information has been received from the first wireless terminal and a data packet for congestion window has been received, or congestion window information has been received from the first wireless terminal and a timeout has occurred.

Further, in a state S2 where the delivery node 101-4 is connected to the second wireless terminal, the control part 116 of the delivery node terminates the connection with the second wireless terminal to connect to the first wireless terminal and transits to the state S1 where the delivery node is connected to the first wireless terminal, subject to any established earliest; the switching time designated by the delivery node condition of the delivery node designation information has passed before reception of congestion window information from the second wireless terminal, or congestion window information has been received from the second wireless terminal and a data packet for congestion window has been received, or congestion window information has been received from the second wireless terminal and a timeout has occurred.

Herein, congestion window information refers to the number of packets or the size of data that can be transmitted without waiting for a positive acknowledgement. Moreover, a time before a timeout occurs is generally set to a longer time than a switching time designated by a delivery node condition.

Figure 25:
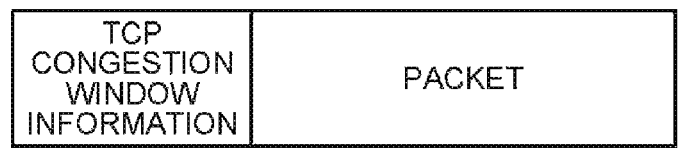
FIG. 25 is a view showing an example of a format of a packet including TCP congestion window information and an encapsulation packet in which the packet is encapsulated used in the third exemplary embodiment of the present invention.
Figure 25:
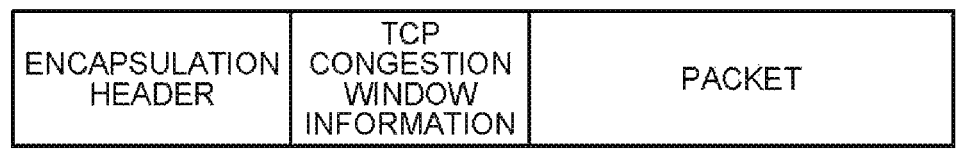

In this exemplary embodiment, in the case of performing TCP/IP communication, the application execution part 111-1 of the wireless terminal 101-1 adds TCP congestion window information to, for example, a head packet of a series of packets for transmitting data for a congestion window, for example, as shown in FIG. 25A, and transmits to the control part 114-1 through the virtual network interface 113-1. The control part 114-1 encapsulates the packet with the congestion window information added with the use of a predetermined encapsulation header, for example, as shown in FIG. 25B, and transmits to the delivery node 101-4. Likewise, in the case of performing TCP/IP communication, the application execution part 111-5 of the wireless terminal 101-5 adds TCP congestion window information to, for example, a head packet of a series of packets for transmitting data for a congestion window, and transmits to the control part 114-5 through the virtual network interface 113-5. The control part 114-5 encapsulates the packet with the congestion window information added with the use of a predetermined encapsulation header and transmits to the delivery node 101-5.

Figure 26:
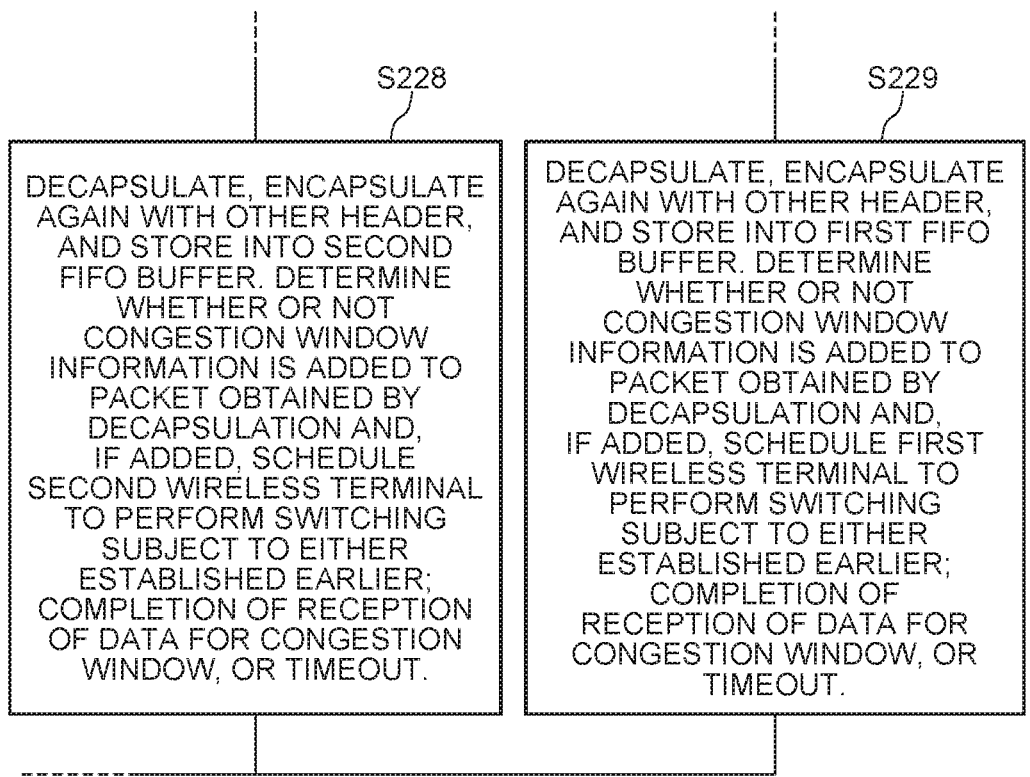
FIG. 26 is a flowchart showing an example of an essential part of an operation of a control part of the delivery node according to the third exemplary embodiment of the present invention.

Further, in this exemplary embodiment, steps S228 and S229 in the flowchart of FIG. 12 showing an example of the operation of the control part 116 of the delivery node are changed as shown in FIG. 26. The steps other than steps S228 and S229 are the same as shown in FIG. 12.

With reference to FIG. 26, at step S228 executed upon receiving an encapsulation packet from the first wireless terminal, the control part 116 of the delivery node performs the following operation in addition to the operation of decapsulating the received encapsulation packet, encapsulating again and storing into the second FIFO. The control part 116 determines whether or not congestion window information is added to the packet obtained by decapsulation and, if added, schedules to switch to the second wireless terminal subject to either established earlier; data for a congestion window has been received, or a timeout has occurred.

Further, at step S229 executed upon receiving an encapsulation packet from the second wireless terminal, the control part 116 of the delivery node performs the following operation in addition to the operation of decapsulating the received encapsulation packet, encapsulating again and storing into the first FIFO. That is, the control part 116 determines whether or not congestion window information is added to the packet obtained by decapsulation and, if added, schedules to switch to the first wireless terminal subject to either established earlier; data for a congestion window has been received, or a timeout has occurred.

By performing the operation as described above, when receiving congestion window information from the first wireless terminal in a state where the delivery node is connected to the first wireless terminal, the delivery node waits to perform switching until completion of reception of data for a congestion window, so that it is possible to prevent needless switching during reception of data packets for a congestion window, and it is possible to, after completion of reception of data packets for a congestion window, immediately transmit the received data packets relating to a congestion window to the second wireless terminal. Likewise, when receiving congestion window information from the second wireless terminal in a state where the delivery node is connected to the second wireless terminal, the delivery node waits to perform switching until completion of reception of data for a congestion window, so that it is possible to prevent needless switching during reception of data packets for a congestion window, and it is possible to, after completion of reception of data packets for a congestion window, immediately transmit the received data packets relating to a congestion window to the first wireless terminal.

Figure 27:
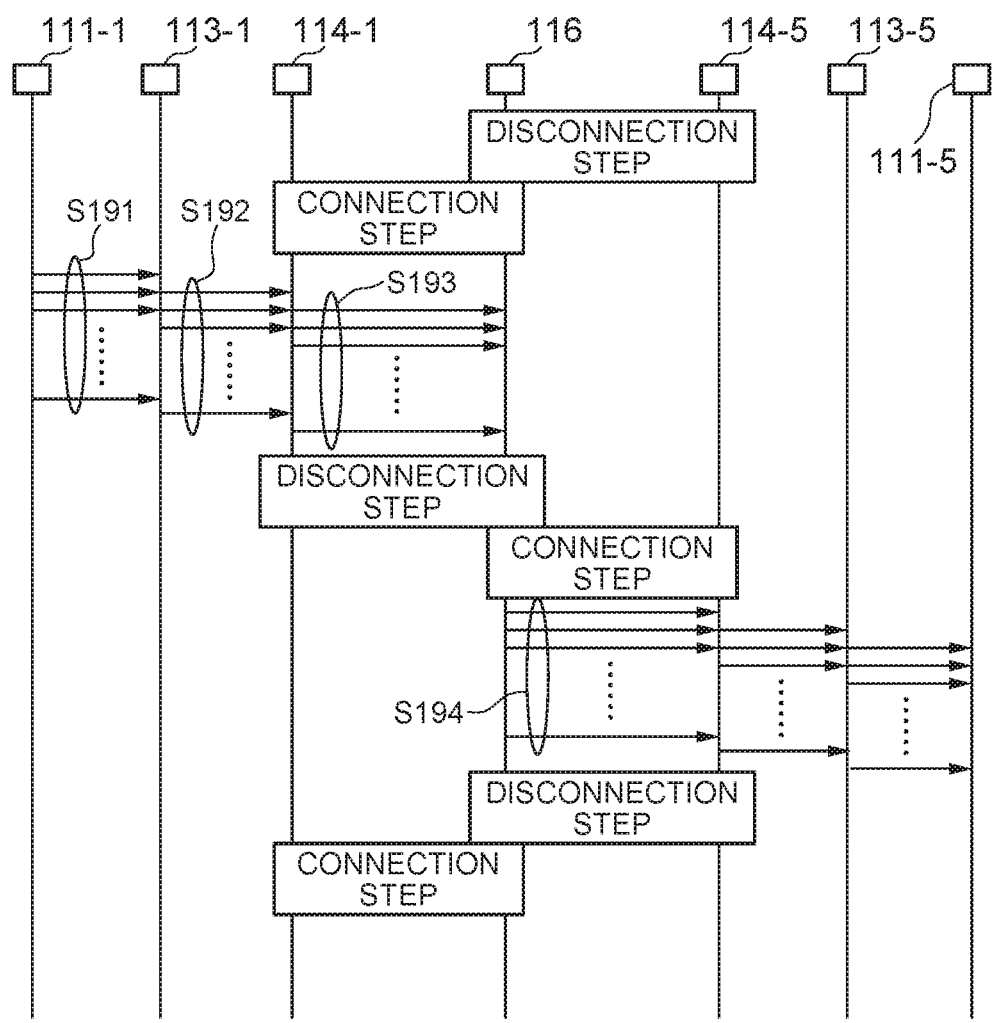
FIG. 27 is a sequence chart showing an example of a procedure for establishing a TCP connection between application programs running on wireless terminals in the third exemplary embodiment of the present invention.

FIG. 27 is a sequence chart showing an example of a procedure to, after establishing a TCP connection, transmit and receive data packets for a congestion window between the application program 115-1 running on the wireless terminal 101-1 and the application program 115-5 running on the wireless terminal 101-5. In the example shown in FIG. 27, after a TCP connection is established, a plurality of data packets for a congestion window are transmitted from the application program 115-1 to the control part 114-1 through the virtual network interface 113-1 (steps S191 and S192). Then, congestion window information is added to the head data packet as described with reference to FIG. 25A.

The control part 114-1 of the wireless terminal 101-1 encapsulates each of the series of data packets received from the application execution part 111-1 through the virtual network interface 113-1 with the use of a predetermined encapsulation header, and transmits to the delivery node 101-4 (step S193). In the case of a packet with congestion window information added, the control part 114-1 adds an encapsulation header to the front of the congestion window information as shown in FIG. 25B.

The control part 116 of the delivery node 101-4 receives the encapsulated packet and detects the congestion window information added to the packet obtained by decapsulating the received encapsulation packet. Therefore, the control part 116 keeps connecting the delivery node 101-4 to the wireless terminal 101-1 until finishing reception of data packets for a data size shown by the detected congestion window information. Consequently, all of the data packets for a congestion window transmitted from the wireless terminal 101-1 are received by the delivery node 101-4 (step S193). Then, upon finishing reception of all of the data packets for a congestion window, the control part 116 performs switching and connects the delivery node 101-4 to the wireless terminal 101-5. Next, the control part 116 transmits the data packet encapsulated again to the wireless terminal 101-5 (step S194).

Thus, according to this exemplary embodiment, it is possible to control a timing for switching by the delivery node 101-4 on the basis of TCP congestion window information, so that efficient switching is possible.

In the abovementioned operation, one TCP connection is established between the wireless terminal 101-1 and the wireless terminal 101-5 through the delivery node 101-4. Meanwhile, a case of establishing a plurality of TCP connections to transmit and receive data in parallel through the plurality of TCP connections can be assumed. In a case where a plurality of TCP connections thus exist, the control part 116 of the delivery node 101-4 may control switching on the basis of the smallest congestion window among the congestion windows of the TCP connections.

Other Exemplary Embodiment

In the first to third exemplary embodiments described above, the application execution part 111-1 of the wireless terminal 101-1 and the application execution part 111-5 of the wireless terminal 101-5 perform TCP/IP communication using TCP as a transport layer protocol. However, communication between applications is not limited to such a communication protocol. For example, the application execution part 111-1 and the application execution part 111-5 may perform TCP/IP communication using another protocol such as UDP as a transport layer protocol.

Further, in the first to third exemplary embodiments described above, TCP/IP communication using UDP as a transport layer protocol is performed between the control part 114-1 of the wireless terminal 101-1 and the control part 116 of the delivery node 101-4 and between the control part 116 of the delivery node 101-4 and the control part 114-5 of the wireless terminal 101-5. However, the communication mentioned above is not limited to such a communication protocol. For example, TCP/IP communication using another protocol such as TCP as a transport layer protocol may be performed between the control part 114-1 and the control part 116 and between the control part 116 and the control part 114-5.

In short, in the present invention, tunneling between the wireless terminal 101-1, 101-5 and the delivery node 101-4 may be TCP over UDP, UDP over TCP, UDP over UDP, TCP over TCP, or the like.

Further, in the first to third exemplary embodiments described above, communication is directly performed through the delivery node between the application program running on the wireless terminal 101-1 serving as the group owner of the group G1 and the application program running on the wireless terminal 101-5 serving as the group owner of the group G2. However, according to the present invention, communication is possible through the delivery node between an application program running on any wireless terminal belonging to the group G1 and an application program running on any wireless terminal belonging to the group G2. In a case where a client wireless terminal of the group G1 communicates with a wireless terminal belonging to the group G2 through the delivery node, they perform communication with the use of the wireless terminal 101-1 serving as the group owner of the group G1 as an access point. Likewise, in a case where a client wireless terminal of the group G2 communicates with a wireless terminal belonging to the group G1 through the delivery node, they perform communication with the use of the wireless terminal 101-5 serving as the group owner of the group G2 as an access point.

Further, in the third exemplary embodiment described above, a timing for switching by the delivery node 101-4 is controlled on the basis of TCP congestion window information and a timeout. However, the delivery node 101-4 in the present invention may generally control a timing for switching on the basis of the number of received packets and a timeout. For example, the number of received packets may be previously set as a system parameter in the delivery node 101-4, or may be designated in the delivery node designation information. Moreover, the delivery node 101-4 may be configured to perform switching in a case where, before receiving packets of the abovementioned number, a time passed after a connection starts reaches a preset timeout time.

The present invention is not limited to the exemplary embodiments described above. The configurations and exemplary embodiments of the present invention can be changed in various manners that can be understood by those skilled in the art within the scope of the present invention.

The present invention is based upon and claims the benefit of priority from Japanese patent application No. 2016-000858, filed on Jan. 6, 2016, the disclosure of which is incorporated herein in its entirety by reference.

INDUSTRIAL APPLICABILITY

The present invention can be used in a P2P network composed of a plurality of wireless terminals (node) that can dynamically form a group.

The whole or part of the exemplary embodiments disclosed above can be described as, but not limited to, the following supplementary notes.

(Supplementary Note 1)
A communication system comprising a first wireless terminal, a second wireless terminal and a third wireless terminal, the first wireless terminal having a first physical IP address and a first virtual IP address and belonging to a first group, the second wireless terminal having a second physical IP address and a second virtual IP address and belonging to a second group, the third wireless terminal having a third physical IP address and alternately performing switching to disassociate itself from the first group and connect to the second group and switching to disassociate itself from the second group and connect to the first group, wherein:
the first wireless terminal includes:
a first application execution part configured to execute a first application program to perform communication;
a first physical network interface having the first physical IP address;
a first virtual network interface having the first virtual IP address; and
a first control part;
the second wireless terminal includes:
a second application execution part configured to execute a second application program to perform communication;
a second physical network interface having the second physical IP address;
a second virtual network interface having the second virtual IP address; and
a second control part;
the third wireless terminal includes:
a third physical network interface having the third physical IP address; and
a third control part;
the first control part is configured to, upon receiving a first packet having a first header with the second virtual IP address set as a destination IP address from the first application execution part through the first virtual network interface, while the third wireless terminal is being connected to the first wireless terminal, transmit a first encapsulation packet to the third wireless terminal through the first physical network interface, the first encapsulation packet being obtained by encapsulating the first packet with use of a first encapsulation header with the third physical IP address set as a destination IP address;
the third control part is configured to, upon receiving the first encapsulation packet through the third physical network interface, while the second wireless terminal is being connected to the third wireless terminal, transmit a second encapsulation packet to the second wireless terminal through the third physical network interface, the second encapsulation packet being obtained by encapsulating the first packet obtained by decapsulating the first encapsulation packet with use of a second encapsulation header with the second physical IP address set as a destination IP address; and the second control part is configured to, upon receiving the second encapsulation packet through the second physical network interface, transmit the first packet obtained by decapsulating the second encapsulation packet to the second application execution part through the second virtual network interface.

(Supplementary Note 2)
The communication system according to Supplementary Note 1, wherein:
the second control part is configured to, upon receiving a second packet having a second header with the first virtual IP address set as a destination IP address from the second application execution part through the second virtual network interface, while the third wireless terminal is being connected to the second wireless terminal, transmit a third encapsulation packet to the third wireless terminal through the second physical network interface, the third encapsulation packet being obtained by encapsulating the second packet with use of a third encapsulation header with the third physical IP address set as a destination IP address;
the third control part is configured to, upon receiving the third encapsulation packet through the third physical network interface, while the first wireless terminal is being connected to the third wireless terminal, transmit a fourth encapsulation packet to the first wireless terminal through the third physical network interface, the fourth encapsulation packet being obtained by encapsulating the second packet obtained by decapsulating the third encapsulation packet with use of a fourth encapsulation header with the first physical IP address set as a destination IP address; and
the first control part is configured to, upon receiving the fourth encapsulation packet through the first physical network interface, transmit the second packet obtained by decapsulating the fourth encapsulation packet to the first application execution part through the first virtual network interface.

(Supplementary Note 3)
The communication system according to Supplementary Note 1 or 2, wherein the third control part is configured to control operation of the switching on basis of a number of received packets or a timeout.

(Supplementary Note 4)
The communication system according to any of Supplementary Notes 1 to 3, wherein the third control part is configured to control operation of the switching on basis of a type of the first packet.

(Supplementary Note 5)
The communication system according to any of Supplementary Notes 1 to 4, wherein the third control part is configured to control operation of the switching on basis of congestion window information sent together with the first packet.

(Supplementary Note 6)
The communication system according to any of Supplementary Notes 1 to 5, wherein:
the first header includes a TCP header or a UDP header; and
the first encapsulation header includes a TCP header or a UDP header.

(Supplementary Note 7)
A communication method executed by a communication system,
the communication system including a first wireless terminal, a second wireless terminal and a third wireless terminal, the first wireless terminal having a first physical IP address and a first virtual IP address and belonging to a first group, the second wireless terminal having a second physical IP address and a second virtual IP address and belonging to a second group, the third wireless terminal having a third physical IP address and alternately performing switching to disassociate itself from the first group and connect to the second group and switching to disassociate itself from the second group and connect to the first group, the first wireless terminal including a first application execution part configured to execute a first application program to perform communication, a first physical network interface having the first physical IP address, a first virtual network interface having the first virtual IP address, and a first control part, the second wireless terminal including a second application execution part configured to execute a second application program to perform communication, a second physical network interface having the second physical IP address, a second virtual network interface having the second virtual IP address, and a second control part, the third wireless terminal including a third physical network interface having the third physical IP address, and a third control part, the communication method, wherein:

upon receiving a first packet having a first header with the second virtual IP address set as a destination IP address from the first application execution part through the first virtual network interface, while the third wireless terminal is being connected to the first wireless terminal, the first control part transmits a first encapsulation packet to the third wireless terminal through the first physical network interface, the first encapsulation packet being obtained by encapsulating the first packet with use of a first encapsulation header with the third physical IP address set as a destination IP address;

upon receiving the first encapsulation packet through the third physical network interface, while the second wireless terminal is being connected to the third wireless terminal, the third control part transmits a second encapsulation packet to the second wireless terminal through the third physical network interface, the second encapsulation packet being obtained by encapsulating the first packet obtained by decapsulating the first encapsulation packet with use of a second encapsulation header with the second physical IP address set as a destination IP address; and upon receiving the second encapsulation packet through the second physical network interface, the second control part transmits the first packet obtained by decapsulating the second encapsulation packet to the second application execution part through the second virtual network interface.

(Supplementary Note 8)

The communication method according to Supplementary Note 7, wherein:

upon receiving a second packet having a second header with the first virtual IP address set as a destination IP address from the second application execution part through the second virtual network interface, while the third wireless terminal is being connected to the second wireless terminal, the second control part transmits a third encapsulation packet to the third wireless terminal through the second physical network interface, the third encapsulation packet being obtained by encapsulating the second packet with use of a third encapsulation header with the third physical IP address set as a destination IP address;

upon receiving the third encapsulation packet through the third physical network interface, while the first wireless terminal is being connected to the third wireless terminal, the third control part transmits a fourth encapsulation packet to the first wireless terminal through the third physical network interface, the fourth encapsulation packet being obtained by encapsulating the second packet obtained by decapsulating the third encapsulation packet with use of a fourth encapsulation header with the first physical IP address set as a destination IP address; and upon receiving the fourth encapsulation packet through the first physical network interface, the first control part transmits the second packet obtained by decapsulating the fourth encapsulation packet to the first application execution part through the first virtual network interface.

(Supplementary Note 9)

The communication method according to Supplementary Note 7 or 8, wherein the third control part controls operation of the switching on basis of a number of received packets or a timeout.

(Supplementary Note 10)

The communication method according to any of Supplementary Notes 7 to 9, wherein the third control part controls operation of the switching on basis of a type of the first packet.

(Supplementary Note 11)

The communication method according to any of Supplementary Notes 7 to 10, wherein the third control part controls operation of the switching on basis of congestion window information sent together with the first packet.

(Supplementary Note 12)

The communication method according to any of Supplementary Notes 7 to 11, wherein:

the first header includes a TCP header or a UDP header; and the first encapsulation header includes a TCP header or a UDP header.

(Supplementary Note 13)

A first wireless terminal having a first physical IP address and a first virtual IP address and belonging to a first group, the wireless terminal comprising:

an application execution part configured to execute a first application program to perform communication;

a physical network interface having the first physical IP address;

a virtual network interface having the first virtual IP address; and a control part configured to, upon receiving a first packet from the application execution part through the virtual network interface, while a third wireless terminal is being connected to the first wireless terminal, transmit a first encapsulation packet to the third wireless terminal through the physical network interface, the first packet having a first header with a second virtual IP address of a second wireless terminal set as a destination IP address, the second wireless terminal having a second physical IP address and a second virtual IP address and belonging to a second group, a second application program to perform communication running on the second wireless terminal, the third wireless terminal having a third physical IP address and alternately performing switching to disassociate itself from the first group and connect to the second group and switching to disassociate itself from the second group and connect to the first group, the first encapsulation packet being obtained by encapsulating the first packet with use of a first encapsulation header with the third physical IP address set as a destination IP address.

(Supplementary Note 14)

The wireless terminal according to Supplementary Note 13, wherein the control part is configured to, upon receiving a second encapsulation packet obtained by encapsulating a second packet having a second header with the first virtual IP address set as a destination IP address from the third wireless terminal through the physical network interface, transmit the second packet obtained by decapsulating the second encapsulation packet to the application execution part through the virtual network interface, the second encapsulation packet being obtained by encapsulating the second packet with use of a second encapsulation header with the first physical IP address as a destination IP address.

(Supplementary Note 15)

The wireless terminal according to Supplementary Note 13 or 14, wherein:

the first header includes a TCP header or a UDP header; and the first encapsulation header includes a TCP header or a UDP header.

(Supplementary Note 16)

A third wireless terminal alternately performing switching to disassociate itself from a first group and connect to a second group and switching to disassociate itself from the second group and connect to the first group, the first group being a group to which a first wireless terminal having a first physical IP address and a first virtual IP address belongs, a first application program to perform communication running on the first wireless terminal, the second group being a group to which a second wireless terminal having a second physical IP address and a second virtual IP address belongs, a second application program to perform communication running on the second wireless terminal, the wireless terminal comprising:

a physical network interface having a third physical IP address; and a control part configured to, upon receiving a first encapsulation packet from the first wireless terminal through the physical network interface, while the second wireless terminal is being connected to the third wireless terminal, transmit a second encapsulation packet to the second wireless terminal through the physical network interface, the first encapsulation packet being obtained by encapsulating a first packet having a first header with the second virtual IP address set as a destination IP address with use of a first encapsulation header with the third physical IP address set as a destination IP address, the second encapsulation packet being obtained by encapsulating the first packet obtained by decapsulating the first encapsulation packet with use of a second encapsulation header with the second physical IP address set as a destination IP address.

(Supplementary Note 17)

The wireless terminal according to Supplementary Note 16, wherein the control part is configured to, upon receiving a third encapsulation packet from the second wireless terminal through the physical network interface, while the first wireless terminal is being connected to the third wireless terminal, transmit a fourth encapsulation packet to the first wireless terminal through the physical network interface, the third encapsulation packet being obtained by encapsulating a second packet having a second header with the first virtual IP address set as a destination IP address with use of a third encapsulation header with the third physical IP address as a destination IP address, the fourth encapsulation packet being obtained by encapsulating the second packet obtained by decapsulating the third encapsulation packet with use of a fourth header with the first physical IP address set as a destination IP address.

(Supplementary Note 18)

The wireless terminal according to Supplementary Note 16 or 17, wherein the control part is configured to control operation of the switching on basis of a number of received packets or a timeout.

(Supplementary Note 19)

The wireless terminal according to any of Supplementary Notes 16 to 18, wherein the control part is configured to control operation of the switching on basis of a type of the first packet.

(Supplementary Note 20)

The wireless terminal according to any of Supplementary Notes 16 to 19, wherein the control part is configured to control operation of the switching on basis of congestion window information sent together with the first packet.

(Supplementary Note 21)

The wireless terminal according to any of Supplementary Notes 16 to 20, wherein:

the first header includes a TCP header or a UDP header; and the first encapsulation header includes a TCP header or a UDP header.

(Supplementary Note 22)

A communication control method executed by a first wireless terminal, the wireless terminal having a first physical IP address and a first virtual IP address, belonging to a first group, and including an application execution part configured to execute a first application program to perform communication, a physical network interface having the first physical IP address, a virtual network interface having the first virtual IP address and a control part, wherein:

upon receiving a first packet from the application execution part through the virtual network interface, while a third wireless terminal is being connected to the first wireless terminal, the control part transmits a first encapsulation packet to the third wireless terminal through the physical network interface, the first packet having a first header with a second virtual IP address of a second wireless terminal set as a destination IP address, the second wireless terminal having a second physical IP address and a second virtual IP address and belonging to a second group, a second application program to perform communication running on the second wireless terminal, the third wireless terminal having a third physical IP address and alternately performing switching to disassociate itself from the first group and connect to the second group and switching to disassociate itself from the second group and connect to the first group, the first encapsulation packet being obtained by encapsulating the first packet with use of a first encapsulation header with the third physical IP address set as a destination IP address.

(Supplementary Note 23)

The communication control method of the wireless terminal according to Supplementary Note 22, wherein, upon receiving a second encapsulation packet obtained by encapsulating a second packet having a second header with the first virtual IP address set as a destination IP address from the third wireless terminal through the physical network interface, the control part transmits the second packet obtained by decapsulating the second encapsulation packet to the application execution part through the virtual network interface, the second encapsulation packet being obtained by encapsulating the second packet with use of a second encapsulation header with the first physical IP address as a destination IP address.

(Supplementary Note 24)

The communication control method of the wireless terminal according to Supplementary Note 22 or 23, wherein:

the first header includes a TCP header or a UDP header; and the first encapsulation header includes a TCP header or a UDP header.

(Supplementary Note 25)

A communication control method of a third wireless terminal, the wireless terminal alternately performing switching to disassociate itself from a first group and connect to a second group and switching to disassociate itself from the second group and connect to the first group, the first group being a group to which a first wireless terminal having a first physical IP address and a first virtual IP address belongs, a first application program to perform communication running on the first wireless terminal, the second group being a group to which a second wireless terminal having a second physical IP address and a second virtual IP address belongs, a second application program to perform communication running on the second wireless terminal, the wireless terminal including a physical network interface having a third physical IP address and a control part, wherein, upon receiving a first encapsulation packet from the first wireless terminal through the physical network interface, while the second wireless terminal is being connected to the third wireless terminal, the control part transmits a second encapsulation packet to the second wireless terminal through the physical network interface, the first encapsulation packet being obtained by encapsulating a first packet having a first header with the second virtual IP address set as a destination IP address with use of a first encapsulation header with the third physical IP address set as a destination IP address, the second encapsulation packet being obtained by encapsulating the first packet obtained by decapsulating the first encapsulation packet with use of a second encapsulation header with the second physical IP address set as a destination IP address.

(Supplementary Note 26)

The communication control method of the wireless terminal according to Supplementary Note 25, wherein, upon receiving a third encapsulation packet from the second wireless terminal through the physical network interface, while the first wireless terminal is being connected to the third wireless terminal, the control part transmits a fourth encapsulation packet to the first wireless terminal through the physical network interface, the third encapsulation packet being obtained by encapsulating a second packet having a second header with the first virtual IP address set as a destination IP address with use of a third encapsulation header with the third physical IP address as a destination IP address, the fourth encapsulation packet being obtained by encapsulating the second packet obtained by decapsulating the third encapsulation packet with use of a fourth header with the first physical IP address set as a destination IP address.

(Supplementary Note 27)

The communication control method of the wireless terminal according to Supplementary Note 25 or 26, wherein the control part controls operation of the switching on basis of a number of received packets or a timeout.

(Supplementary Note 28)

The communication control method of the wireless terminal according to any of Supplementary Notes 25 to 27, wherein the control part controls operation of the switching on basis of a type of the first packet.

(Supplementary Note 29)

The communication control method of the wireless terminal according to any of Supplementary Notes 25 to 28, wherein the control part controls operation of the switching on basis of congestion window information sent together with the first packet.

(Supplementary Note 30)

The communication control method of the wireless terminal according to any of Supplementary Notes 25 to 29, wherein:

the first header includes a TCP header or a UDP header; and the first encapsulation header includes a TCP header or a UDP header.

(Supplementary Note 31)

A computer program comprising instructions for causing a computer to function as an application execution part, a physical network interface, a virtual network interface, and a control part, the computer configuring a first wireless terminal having a first physical IP address and a first virtual IP address and belonging to a first group, the application execution part being configured to execute a first application program to perform communication, the physical network interface having the first physical IP address, the virtual network interface having the first virtual IP address, the control part being configured to, upon receiving a first packet from the application execution part through the virtual network interface, while a third wireless terminal is being connected to the first wireless terminal, transmit a first encapsulation packet to the third wireless terminal through the physical network interface, the first packet having a first header with a second virtual IP address of a second wireless terminal set as a destination IP address, the second wireless terminal having a second physical IP address and a second virtual IP address and belonging to a second group, a second application program to perform communication running on the second wireless terminal, the third wireless terminal having a third physical IP address and alternately performing switching to disassociate itself from the first group and connect to the second group and switching to disassociate itself from the second group and connect to the first group, the first encapsulation packet being obtained by encapsulating the first packet with use of a first encapsulation header with the third physical IP address set as a destination IP address.

(Supplementary Note 32)

The computer program according to Supplementary Note 31, wherein the control part is configured to, upon receiving a second encapsulation packet obtained by encapsulating a second packet having a second header with the first virtual IP address set as a destination IP address from the third wireless terminal through the physical network interface, transmit the second packet obtained by decapsulating the second encapsulation packet to the application execution part through the virtual network interface, the second encapsulation packet being obtained by encapsulating the second packet with use of a second encapsulation header with the first physical IP address as a destination IP address.

(Supplementary Note 33)

The computer program according to Supplementary Note 31 or 32, wherein:

the first header includes a TCP header or a UDP header; and the first encapsulation header includes a TCP header or a UDP header.

(Supplementary Note 34)

A computer program comprising instructions for causing a computer to function as a physical network interface and a control part, the computer configuring a third wireless terminal alternately performing switching to disassociate itself from a first group and connect to a second group and switching to disassociate itself from the second group and connect to the first group, the first group being a group to which a first wireless terminal having a first physical IP address and a first virtual IP address belongs, a first application program to perform communication running on the first wireless terminal, the second group being a group to which a second wireless terminal having a second physical IP address and a second virtual IP address belongs, a second application program to perform communication running on the second wireless terminal, the physical network interface having a physical IP address, the control part being configured to, upon receiving a first encapsulation packet from the first wireless terminal through the physical network interface, while the second wireless terminal is being connected to the third wireless terminal, transmit a second encapsulation packet to the second wireless terminal through the physical network interface, the first encapsulation packet being obtained by encapsulating a first packet having a first header with the second virtual IP address set as a destination IP address with use of a first encapsulation header with the third physical IP address set as a destination IP address, the second encapsulation packet being obtained by encapsulating the first packet obtained by decapsulating the first encapsulation packet with use of a second encapsulation header with the second physical IP address set as a destination IP address.

(Supplementary Note 35)

The computer program according to Supplementary Note 34, wherein the control part is configured to, upon receiving a third encapsulation packet obtained by encapsulating a second packet having a second header with the first virtual IP address set as a destination IP address, with use of a third encapsulation header with the third physical IP address as a destination IP address, from the second wireless terminal through the physical network interface, while the first wireless terminal is being connected to the third wireless terminal, transmit a fourth encapsulation packet to the first wireless terminal through the physical network interface, the fourth encapsulation packet being obtained by encapsulating the second packet obtained by decapsulating the third encapsulation packet, with use of a fourth header with the first physical IP address set as a destination IP address.

(Supplementary Note 36)

The computer program according to Supplementary Note 34 or 35, wherein the third control part is configured to control operation of the switching on basis of a number of received packets or a timeout.

(Supplementary Note 37)

The computer program according to any of Supplementary Notes 34 to 36, wherein the control part is configured to control operation of the switching on basis of a type of the first packet.

(Supplementary Note 38)

The computer program according to any of Supplementary Notes 34 to 37, wherein the control part is configured to control operation of the switching on basis of congestion window information sent together with the first packet.

(Supplementary Note 39)

The computer program according to any of Supplementary Notes 34 to 38, wherein:

the first header includes a TCP header or a UDP header; and the first encapsulation header includes a TCP header or a UDP header.

DESCRIPTION OF NUMERALS 100 communication system
101-1 to 101-7 wireless terminal
111 application execution part
112 physical network interface
113 virtual network interface
114 control part
115 application program
116 control part
120 information processing device
121 arithmetic processing part
122 storage part
123 communication module
124 program
130 packet
131 encapsulation packet

The invention claimed is:

1. A communication system comprising a first wireless terminal, a second wireless terminal, and at least one or more third wireless terminals, wherein one of the at least one or more third wireless terminals is a fourth wireless terminal, the first wireless terminal serving as a group owner of a first peer-to-peer (P2P) group, the second wireless terminal serving as a group owner of a second P2P group that is different from the first P2P group, the fourth wireless terminal serving as a client of the first P2P group and not serving as a client of the second P2P group, wherein:

the first wireless terminal includes:
 a first application program to perform communication;
 a first physical network interface having a first physical IP address;
 a first virtual network interface having a first virtual IP address; and
 a first controller;

the second wireless terminal includes:
 a second application program to perform communication;
 a second physical network interface having a second physical IP address;
 a second virtual network interface having a second virtual IP address; and
 a second controller;

the first controller is configured to, upon receiving a communication start request including the second virtual IP address from the first application program, determine the fourth wireless terminal as a delivery node, and transmit delivery node designation information to the delivery node, the delivery node designation information including information designating the first wireless terminal and the second wireless terminal as switching targets;

the delivery node includes:
 a third physical network interface having a third physical IP address; and
 a third controller;

the third controller is configured to, upon receiving the delivery node designation information, cause the delivery node to alternately and repeatedly perform switching to disassociate itself from the first P2P group and connect to the second P2P group and switching to disassociate itself from the second P2P group and connect to the first P2P group;

the first controller is configured to, upon receiving a first packet having a first header with the second virtual IP address set as a destination IP address from the first application program through the first virtual network interface, while the delivery node is being connected to the first wireless terminal, transmit a first encapsulation packet to the delivery node through the first physical network interface, the first encapsulation packet being obtained by encapsulating the first packet with use of a first encapsulation header with the third physical IP address set as a destination IP address;

the third controller is configured to, upon receiving the first encapsulation packet through the third physical network interface, while the second wireless terminal is being connected to the delivery node, transmit a second encapsulation packet to the second wireless terminal through the third physical network interface, the second encapsulation packet being obtained by encapsulating the first packet obtained by decapsulating the first encapsulation packet with use of a second encapsulation header with the second physical IP address set as a destination IP address; and the second controller is configured to, upon receiving the second encapsulation packet through the second physical network interface, transmit the first packet obtained by decapsulating the second encapsulation packet to the second application program through the second virtual network interface.

2. The communication system according to claim 1, wherein the first controller is configured to determine at least one of the at least one or more third wireless terminals that can discover the second wireless terminal as the delivery node.

3. The communication system according to claim 1, wherein the delivery node is configured to disassociate itself from the first P2P group by transmitting Deauthentication or Disassociation Indication to the first wireless terminal.

4. The communication system according to claim 1, wherein the delivery node is configured to, when the second wireless terminal is a Persistent group owner, connect to the second wireless terminal by Invitation process.

5. A communication method executed by a communication system, the communication system including a first wireless terminal, a second wireless terminal, and at least one or more third wireless terminals, wherein one of the at least one or more third wireless terminals is a fourth wireless terminal, the first wireless terminal serving as a group owner of a first peer-to-peer (P2P) group, the second wireless terminal serving as a group owner of a second P2P group that is different from the first P2P group, the fourth wireless terminal serving as a client of the first P2P group and not serving as a client of the second P2P group, the first wireless terminal including a first application program to perform communication, a first physical network interface having a first physical IP address, a first virtual network interface having a first virtual IP address, and a first controller, the second wireless terminal including a second application program to perform communication, a second physical network interface having a second physical IP address, a second virtual network interface having a second virtual IP address, and a second controller, the communication method, wherein:

upon receiving a communication start request including the second virtual IP address from the first application program, the first controller determines the fourth wireless terminal as a delivery node, and transmits delivery node designation information to the delivery node, the delivery node designation information including information designating the first wireless terminal and the second wireless terminal as switching targets;

the delivery node includes:
a third physical network interface having a third physical IP address; and
a third controller;

upon receiving the delivery node designation information, the third controller causes the delivery node to alternately and repeatedly perform switching to disassociate itself from the first P2P group and connect to the second P2P group and switching to disassociate itself from the second P2P group and connect to the first P2P group;

upon receiving a first packet having a first header with the second virtual IP address set as a destination IP address from the first application program through the first virtual network interface, while the delivery node is being connected to the first wireless terminal, the first controller transmits a first encapsulation packet to the delivery node through the first physical network interface, the first encapsulation packet being obtained by encapsulating the first packet with use of a first encapsulation header with the third physical IP address set as a destination IP address;

upon receiving the first encapsulation packet through the third physical network interface, while the second wireless terminal is being connected to the delivery node, the third controller transmits a second encapsulation packet to the second wireless terminal through the third physical network interface, the second encapsulation packet being obtained by encapsulating the first packet obtained by decapsulating the first encapsulation packet with use of a second encapsulation header with the second physical IP address set as a destination IP address; and upon receiving the second encapsulation packet through the second physical network interface, the second controller transmits the first packet obtained by decapsulating the second encapsulation packet to the second application program through the second virtual network interface.

6. A first wireless terminal serving as a group owner of a first peer-to-peer (P2P) group and including a first application program to perform communication, a first physical network interface having a first physical IP address, a first virtual network interface having a first virtual IP address, and a controller, the first wireless terminal including a second application program to perform communication, a second physical network interface having a second physical IP address, a second virtual network interface having a second virtual IP address, wherein a plurality of third wireless terminals includes the first wireless terminal and a fourth wireless terminal, the first wireless terminal having, as a client of the first P2P group, the fourth wireless terminal, the fourth wireless terminal not serving as a client of a second P2P group that is different from the first P2P group of a second wireless terminal serving as a group owner of the second P2P group, wherein the controller is configured to:

upon receiving a communication start request including the second virtual IP address from the first application program, determine the fourth wireless terminal as a delivery node and transmit delivery node designation information to the delivery node, the delivery node alternately and repeatedly performing switching to disassociate itself from the first P2P group and connect to the second P2P group and switching to disassociate itself from the second P2P group and connect to the first P2P group, the delivery node designation information including information designating the first wireless terminal and the second wireless terminal as switching targets; and upon receiving a first packet having a first header with the second virtual IP address set as a destination IP address from the first application program through the first virtual network interface, while the delivery node is being connected to the first wireless terminal, transmit a first encapsulation packet to the delivery node through the physical network interface, the first encapsulation packet being obtained by encapsulating the first packet with use of a first encapsulation header with the third physical IP address set as a destination IP address.

7. A third wireless terminal serving as a client of a first peer-to-peer (P2P) group in which a first wireless terminal is a group owner and not serving as a client of a second P2P group in which a second wireless terminal is a group owner, the first wireless terminal including a first application program to perform communication, a first physical network interface having a first physical IP address, and a first virtual network interface having a first virtual IP address, the second wireless terminal including a second application program to perform communication, a second physical network interface having a second physical IP address, and a second virtual network interface having a second virtual IP address, the third wireless terminal comprising:

a third physical network interface having a third physical IP address; and a controller, wherein the controller is configured to, upon receiving delivery node designation information including information designating the first wireless terminal and the second wireless terminal as switching targets from the first wireless terminal, cause the third wireless terminal to operate as a delivery node alternately and repeatedly performing switching to disassociate itself from the first P2P group and connect to the second P2P group and switching to disassociate itself from the second P2P group and connect to the first P2P group and, upon receiving a first encapsulation packet from the first wireless terminal through the third physical network interface, while the second wireless terminal is being connected to the delivery node, transmit a second encapsulation packet to the second wireless terminal through the third physical network interface, the first encapsulation packet being obtained by encapsulating a first packet having a first header with the second virtual IP address set as a destination IP address with use of a first encapsulation header with the third physical IP address set as a destination IP address, the second encapsulation packet being obtained by encapsulating the first packet obtained by decapsulating the first encapsulation packet with use of a second encapsulation header with the second physical IP address set as a destination IP address.

8. The third wireless terminal according to claim 7, wherein the controller is configured to, upon receiving a third encapsulation packet from the second wireless terminal through the third physical network interface, while the first wireless terminal is being connected to the delivery node, transmit a fourth encapsulation packet to the first wireless terminal through the third physical network interface, the third encapsulation packet being obtained by encapsulating a second packet having a second header with the first virtual IP address set as a destination IP address with use of a third encapsulation header with the third physical IP address as a destination IP address, the fourth encapsulation packet being obtained by encapsulating the second packet obtained by decapsulating the third encapsulation packet with use of a fourth header with the first physical IP address set as a destination IP address.

9. The third wireless terminal according to claim 7, wherein the controller is configured to control operation of the switching on basis of a number of received packets or a timeout.

10. The third wireless terminal according to claim 7, wherein the controller is configured to control operation of the switching on basis of a type of the first packet.

11. The third wireless terminal according to claim 7, wherein the controller is configured to control operation of the switching on basis of congestion window information sent together with the first packet.

12. The third wireless terminal according to claim 7, wherein:

the first header includes a TCP header or a UDP header; and the first encapsulation header includes a TCP header or a UDP header.

13. A communication control method executed by a first wireless terminal including a first application program to perform communication, a first physical network interface having a first physical IP address, a first virtual network interface having a first virtual IP address and a controller and serving as a group owner of a first peer-to-peer (P2P) group, the first wireless terminal having at least one third wireless terminal as a client, the at least one third wireless terminal not serving as a client of a second P2P group in which a second wireless terminal including a second application program to perform communication, a second physical network interface having a second physical IP address, and a second virtual network interface having a second virtual IP address is a group owner, wherein:

upon receiving a communication start request including the second virtual IP address from the first application program, the controller determines a fourth wireless terminal as a delivery node and transmits delivery node designation information to the delivery node, wherein one of the at least one third wireless terminal is the fourth wireless terminal, the delivery node alternately and repeatedly performing switching to disassociate itself from the first P2P group and connect to the second P2P group and switching to disassociate itself from the second P2P group and connect to the first P2P group, the delivery node designation information including information designating the first wireless terminal and the second wireless terminal as switching targets; and upon receiving a first packet having a first header with the second virtual IP address set as a destination IP address from the first application program through the first virtual network interface, while the delivery node is being connected to the first wireless terminal, the controller transmits a first encapsulation packet to the delivery node through the first physical network interface, the first encapsulation packet being obtained by encapsulating the first packet with use of a first encapsulation header with the third physical IP address set as a destination IP address.

14. A communication control method of a third wireless terminal serving as a client of a first peer-to-peer (P2P) group in which a first wireless terminal including a first application program to perform communication, a first physical network interface having a first physical IP address, a first virtual network interface having a first virtual IP address and a controller is a group owner, the third wireless terminal not serving as a client of a second P2P group in which a second wireless terminal including a second application program to perform communication, a second physical network interface having a second physical IP address and a second virtual network interface having a second virtual IP address is a group owner, the third wireless terminal including a third physical network interface having a third physical IP address and a controller, wherein:

upon receiving delivery node designation information including information designating the first wireless terminal and the second wireless terminal as switching targets from the first wireless terminal, the controller causes the third wireless terminal to operate as a delivery node alternately and repeatedly performing switching to disassociate itself from the first P2P group and connect to the second P2P group and switching to disassociate itself from the second P2P group and connect to the first P2P group; and upon receiving a first encapsulation packet from the first wireless terminal through the third physical network interface, while the second wireless terminal is being connected to the delivery node, the controller transmits a second encapsulation packet to the second wireless terminal through the third physical network interface, the first encapsulation packet being obtained by encapsulating a first packet having a first header with the second virtual IP address set as a destination IP address with use of a first encapsulation header with the third physical IP address set as a destination IP address, the second encapsulation packet being obtained by encapsulating the first packet obtained by decapsulating the first encapsulation packet with use of a second encapsulation header with the second physical IP address set as a destination IP address.

15. A non-transitory computer-readable medium storing a program comprising instructions for causing a computer to perform a first process and a second process, the computer configuring a first wireless terminal including a first application program to perform communication, a first physical network interface having a first physical IP address and a first virtual network interface having a first virtual IP address and serving as a group owner of a first peer-to-peer (P2P) group, the first wireless terminal having at least one third wireless terminal as a client, wherein one of the at least one third wireless terminal is a fourth wireless terminal, the fourth wireless terminal not serving as a client of a second P2P group in which a second wireless terminal including a second application program to perform communication, a second physical network interface having a second physical IP address and a second virtual network interface having a second virtual IP address is a group owner, the first process being a process to, upon receiving a communication start request including the second virtual IP address from the first application program, determine at least one of the third wireless terminal as a delivery node and transmit delivery node designation information to the delivery node, the delivery node alternately and repeatedly performing switching to disassociate itself from the first P2P group and connect to the second P2P group and switching to disassociate itself from the second P2P group and connect to the first P2P group, the delivery node designation information including information designating the first wireless terminal and the second wireless terminal as switching targets, the second process being a process to, upon receiving a first packet having a first header with the second virtual IP address set as a destination IP address from the first application program through the first virtual network interface, while the delivery node is being connected to the first wireless terminal, transmit a first encapsulation packet to the delivery node through the first physical network interface, the first encapsulation packet being obtained by encapsulating the first packet with use of a first encapsulation header with the third physical IP address set as a destination IP address.

16. A non-transitory computer-readable medium storing a program comprising instructions for causing a computer to perform a first process and a second process, the computer configuring a third wireless terminal serving as a client of a first peer-to-peer (P2P) group in which a first wireless terminal including a first application program to perform communication, a first physical network interface having a first physical IP address, a first virtual network interface having a first virtual IP address and a controller, the third wireless terminal not serving as a client of a second P2P group in which a second wireless terminal including a second application program to perform communication, a second physical network interface having a second physical IP address, and a second virtual network interface having a second virtual IP address is a group owner, the third wireless terminal including a third physical network interface having a third physical IP address, the first process being a process to, upon receiving delivery node designation information including information designating the first wireless terminal and the second wireless terminal as switching targets from the first wireless terminal, cause the third wireless terminal to operate as a delivery node alternately and repeatedly performing switching to disassociate itself from the first P2P group and connect to the second P2P group and switching to disconnect itself from the second P2P group and connect to the first P2P group, the second process being a process to, upon receiving a first encapsulation packet from the first wireless terminal through the third physical network interface, while the second wireless terminal is being connected to the delivery node, transmit a second encapsulation packet to the second wireless terminal through the third physical network interface, the first encapsulation packet being obtained by encapsulating a first packet having a first header with the second virtual IP address set as a destination IP address with use of a first encapsulation header with the third physical IP address set as a destination IP address, the second encapsulation packet being obtained by encapsulating the first packet obtained by decapsulating the first encapsulation packet with use of a second encapsulation header with the second physical IP address set as a destination IP address.

* * * * *